(12) United States Patent
Yoo et al.

(10) Patent No.: US 11,464,355 B2
(45) Date of Patent: Oct. 11, 2022

(54) HYDROGEN WATER GENERATOR

(71) Applicant: LG ELECTRONICS INC., Seoul (KR)

(72) Inventors: Hyun Sun Yoo, Seoul (KR); Joo Gyeom Kim, Seoul (KR); Jae Hung Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 552 days.

(21) Appl. No.: 16/657,780

(22) Filed: Oct. 18, 2019

(65) Prior Publication Data

US 2020/0359831 A1    Nov. 19, 2020

(30) Foreign Application Priority Data

May 14, 2019  (KR) .................. 10-2019-0056375
Jul. 10, 2019  (KR) .................. 10-2019-0083291

(51) Int. Cl.
| | |
|---|---|
| *A47J 31/44* | (2006.01) |
| *C02F 1/461* | (2006.01) |
| *C25B 1/04* | (2021.01) |
| *B67D 1/00* | (2006.01) |
| *B67D 1/04* | (2006.01) |
| *C02F 1/00* | (2006.01) |

(52) U.S. Cl.
CPC ....... *A47J 31/4407* (2013.01); *C02F 1/46104* (2013.01); *B67D 1/001* (2013.01); *B67D 1/04* (2013.01); *B67D 2001/0475* (2013.01); *C02F 1/008* (2013.01); *C02F 2209/005* (2013.01); *C25B 1/04* (2013.01)

(58) Field of Classification Search
None
See application file for complete search history.

(56) References Cited

U.S. PATENT DOCUMENTS

2016/0076155 A1    3/2016   Kim et al.
2018/0002201 A1    1/2018   Luo et al.

FOREIGN PATENT DOCUMENTS

| CN | 101437428 A | 5/2009 |
| CN | 102295326 A | 12/2011 |
| CN | 205338661 U | 6/2016 |
| CN | 107720893 A | 2/2018 |
| CN | 108209579 A | 6/2018 |
| CN | 108568223 A | 9/2018 |

(Continued)

OTHER PUBLICATIONS

Ku et al. KR 2019/0030836 A, machine translation (Year: 2019).*
Suk, KR 20110009584 A, machine translation (Year: 2011).*

*Primary Examiner* — Wojciech Haske
(74) *Attorney, Agent, or Firm* — Dentons US LLP

(57) ABSTRACT

A hydrogen water generator includes a body including a first outlet coupled to a first inlet for receiving supply water, and a second inlet coupled to a second outlet, the second outlet for discharging hydrogen water, a water tank assembly detachably attached to the body, the water tank assembly including a water tank and an electrode module coupled to the water tank, and the water tank including a third inlet and a third outlet. When the water tank assembly is attached to the body, the third inlet of the water tank couples to the first outlet of the body, and the third outlet of the water tank couples with the second inlet of the body.

20 Claims, 25 Drawing Sheets

(56) References Cited

FOREIGN PATENT DOCUMENTS

| KR | 20110009584 A | * | 1/2011 | ............... C25B 1/04 |
| KR | 10-1677600 B1 | | 11/2016 | |
| KR | 10-1810149 B1 | | 12/2017 | |
| KR | 101889498 B1 | | 8/2018 | |
| KR | 1020190030836 A | | 3/2019 | |

* cited by examiner

【FIG. 1】
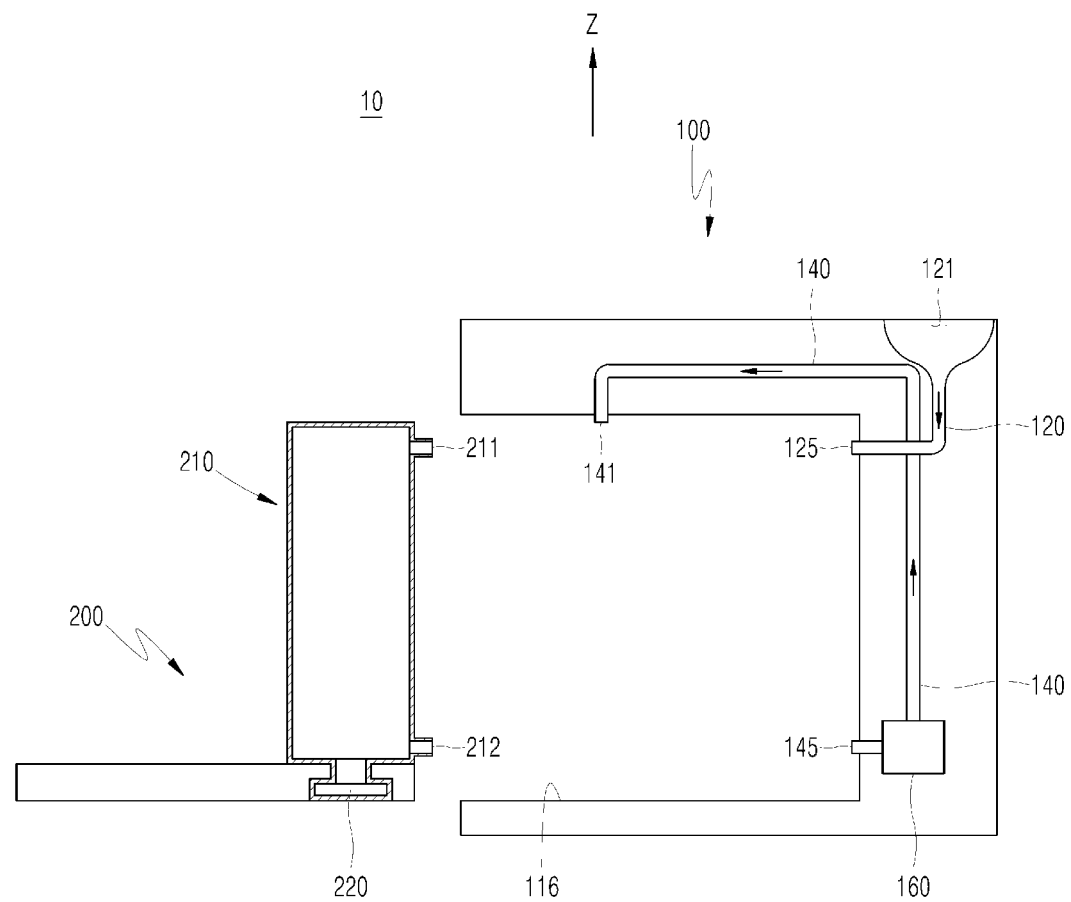

[FIG. 2A]
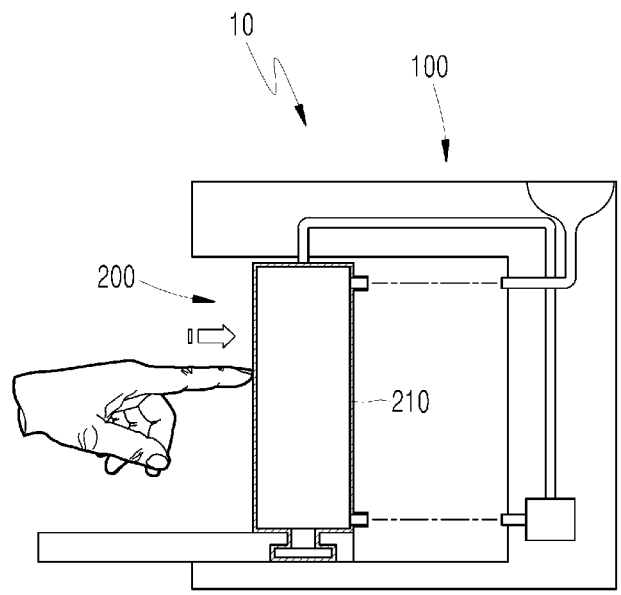
[FIG. 2B]
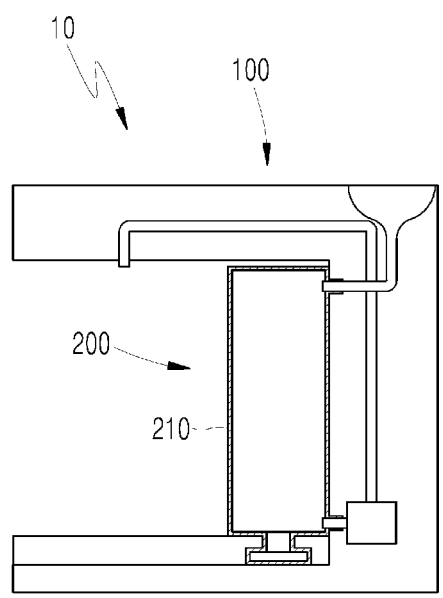

【FIG. 3】
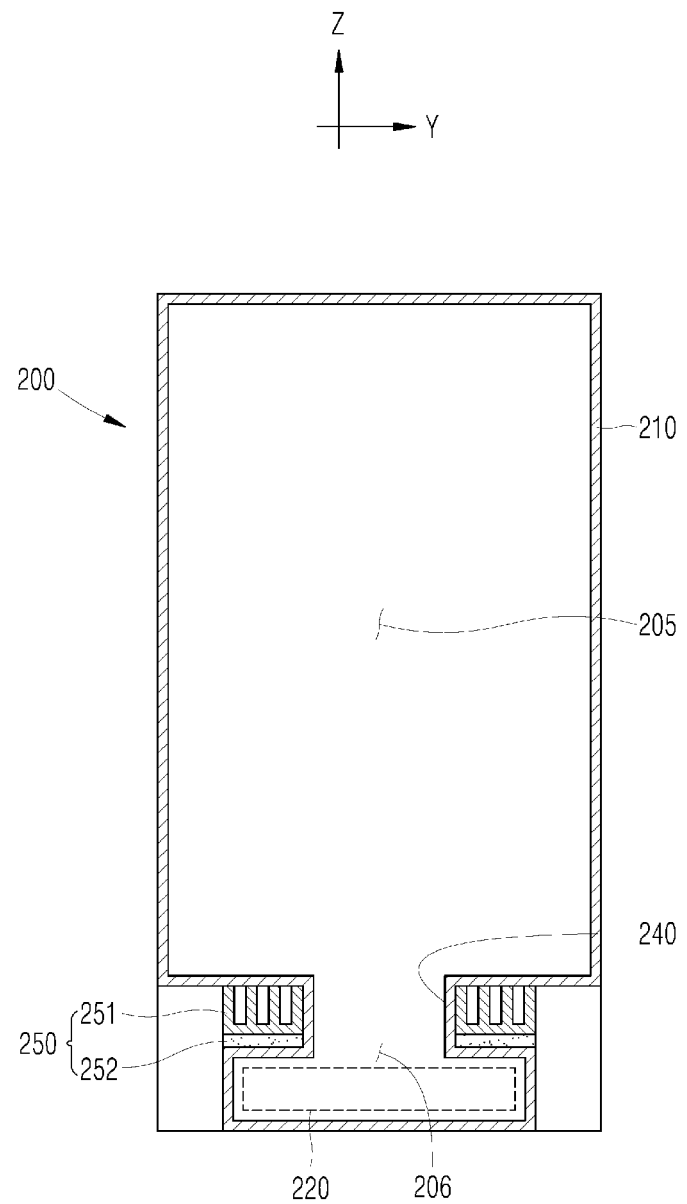

[FIG. 4]
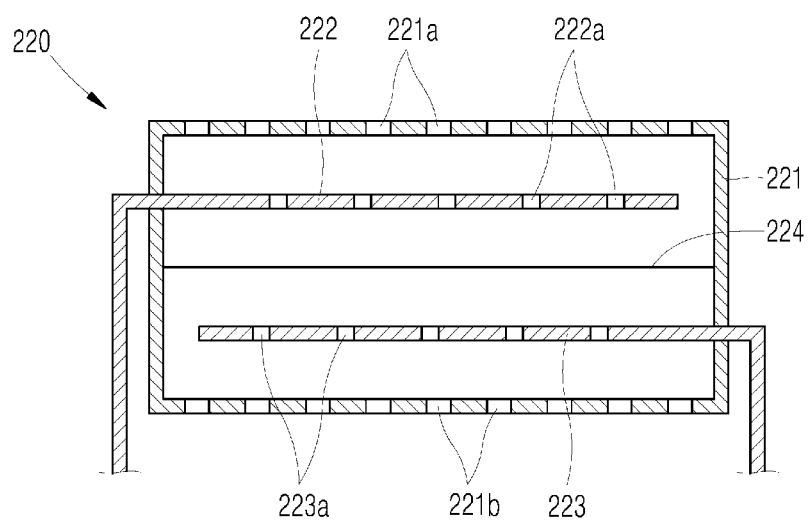

【FIG. 5A】
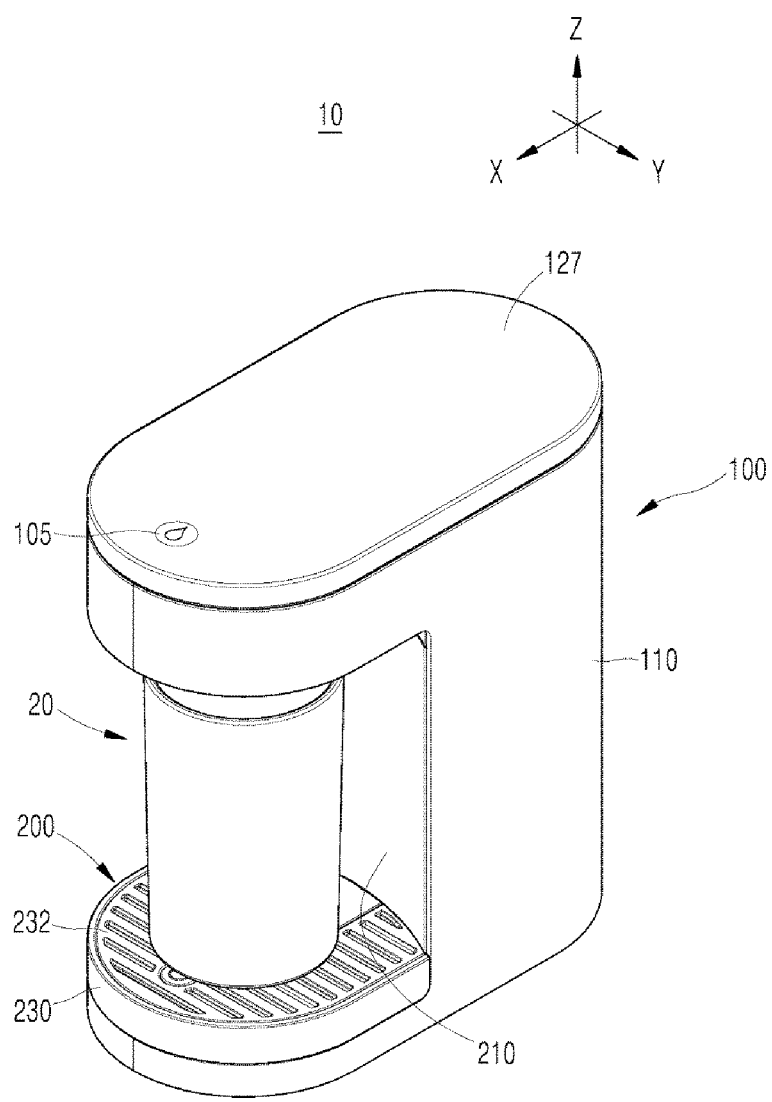

【FIG. 5B】
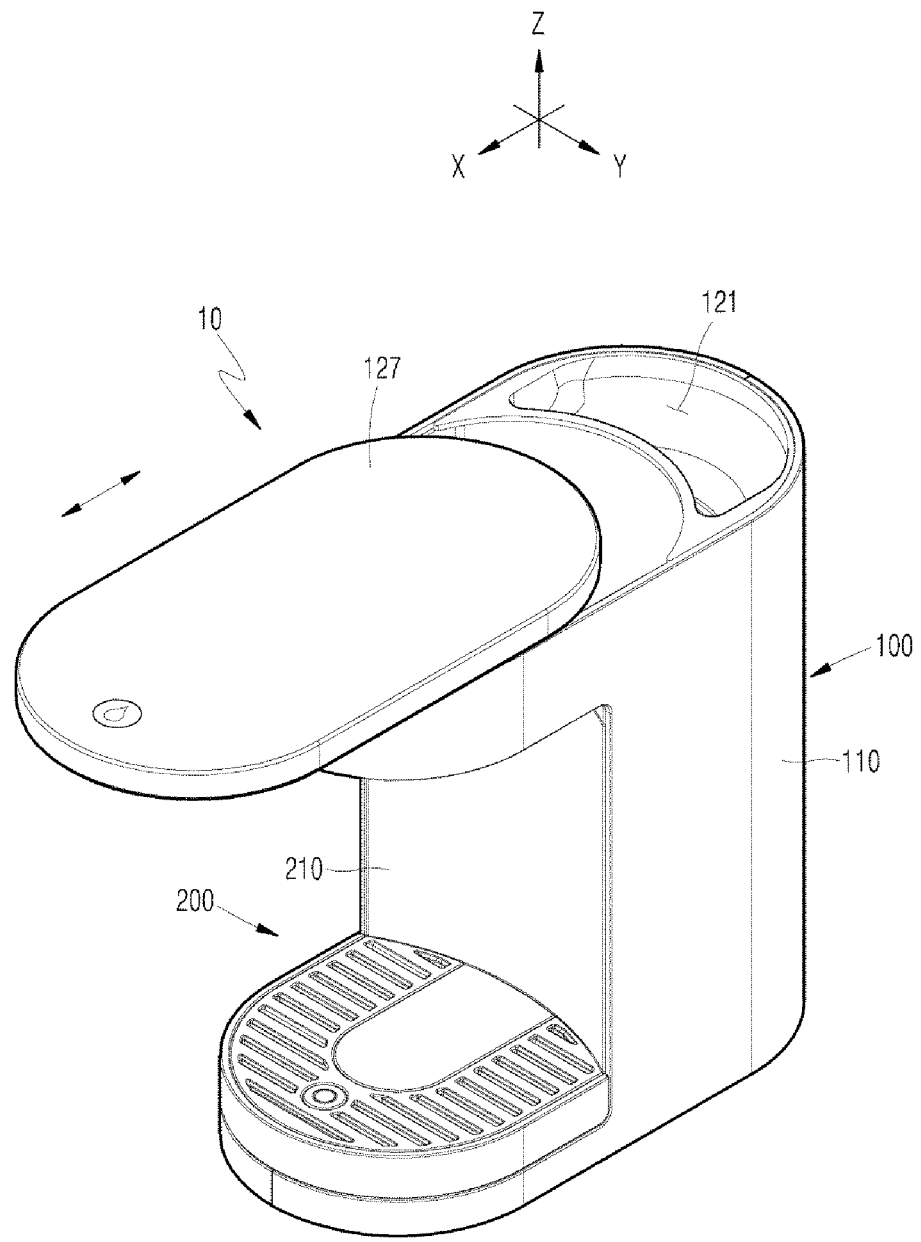

[FIG. 6]
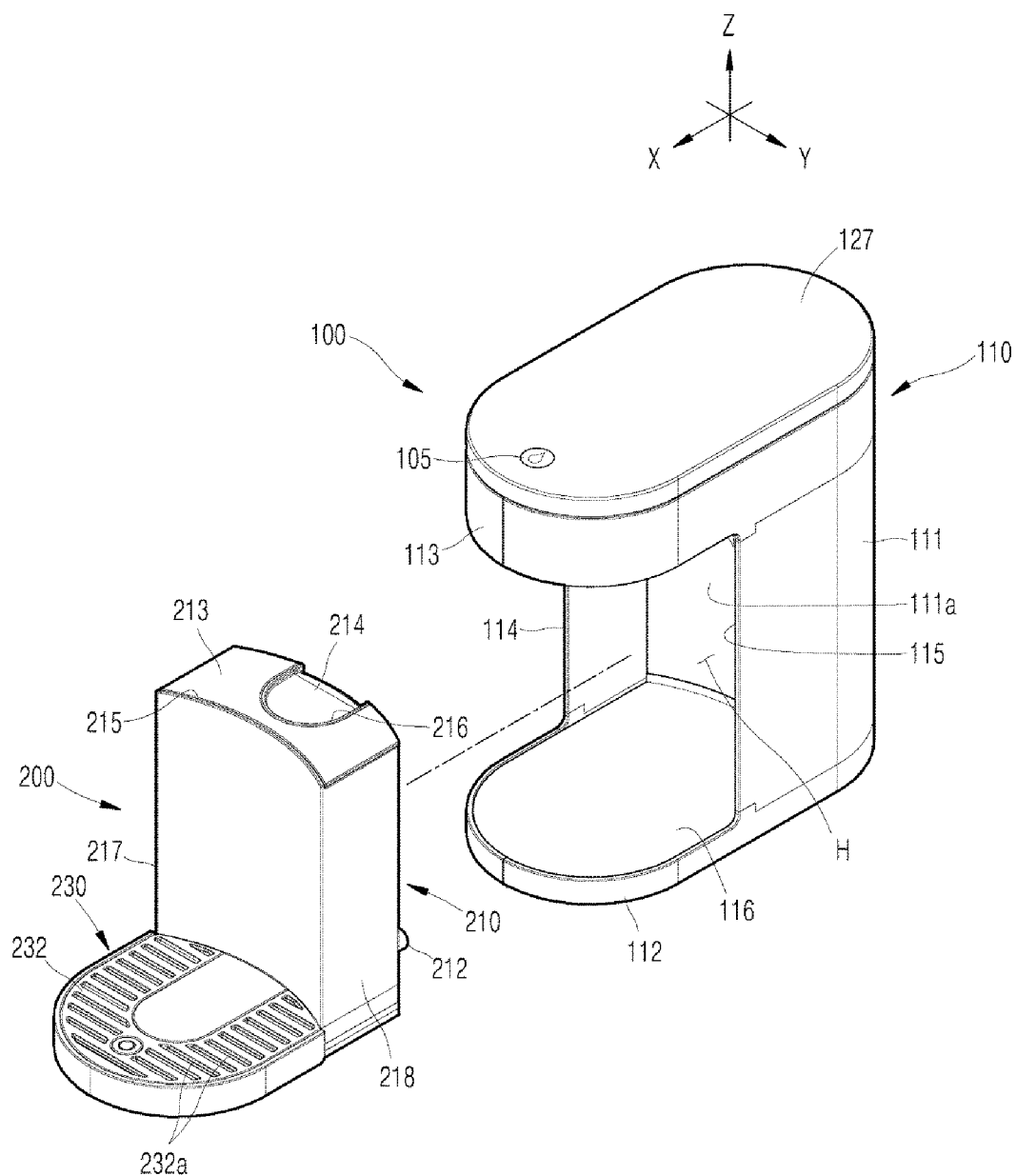

【FIG. 7A】
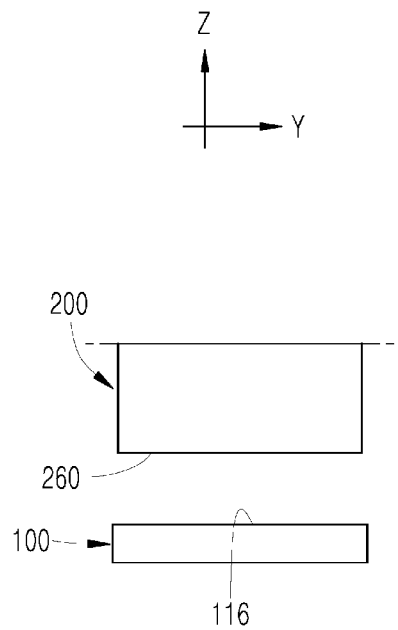
【FIG. 7B】
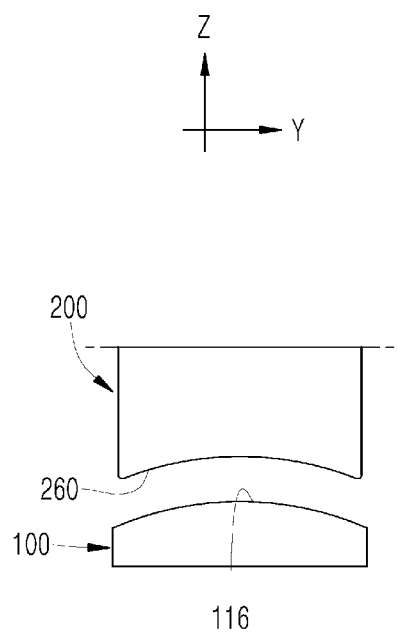

[FIG. 7C]
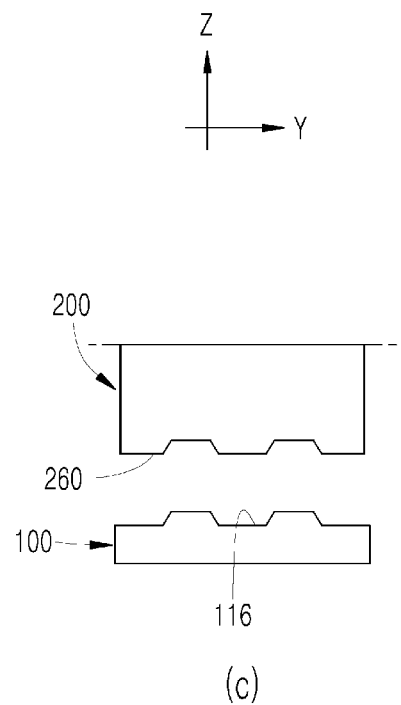
(c)

[FIG. 8A]
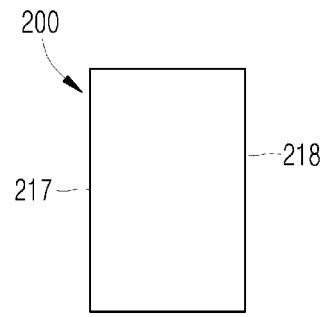
[FIG. 8B]
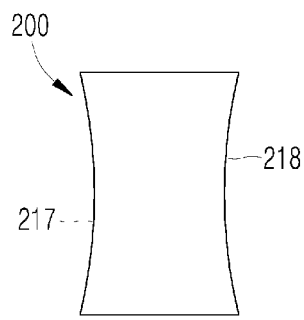
[FIG. 8C]
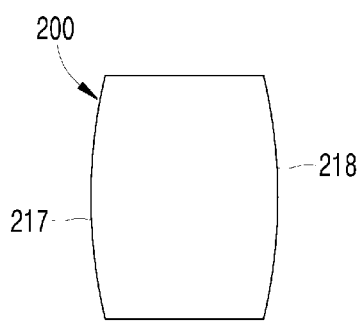

[FIG. 8D]
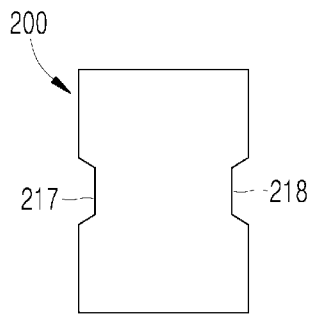
[FIG. 8E]
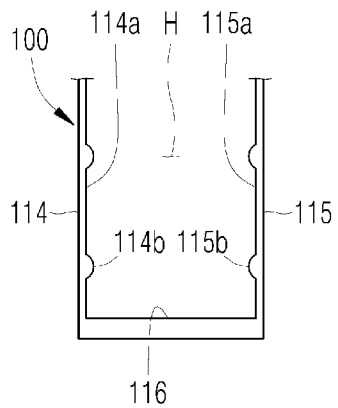
[FIG. 8F]
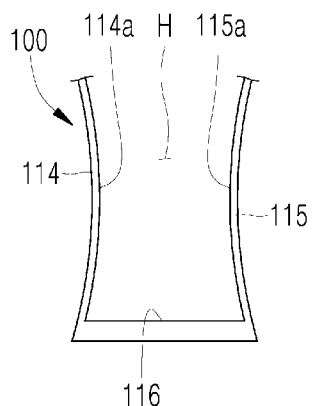

[FIG. 8G]
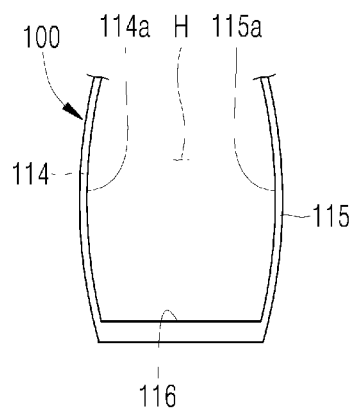
[FIG. 8H]
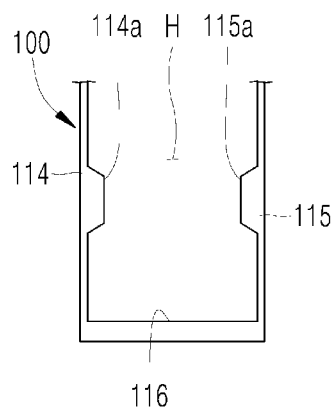

[FIG. 9A]
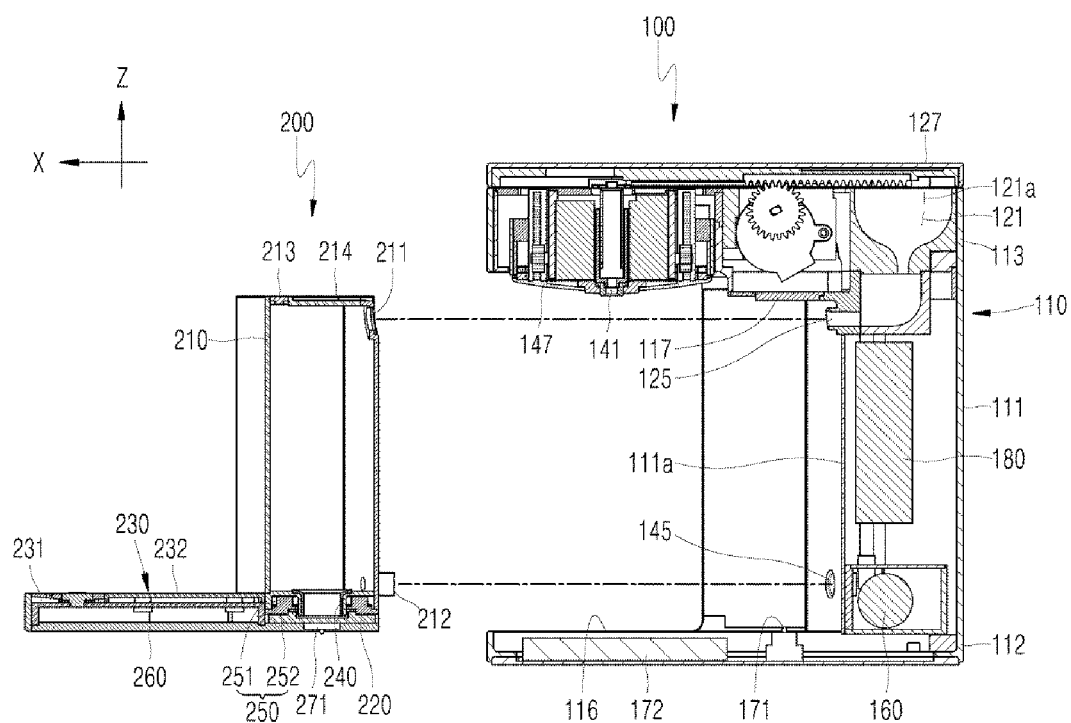

[FIG. 9B]
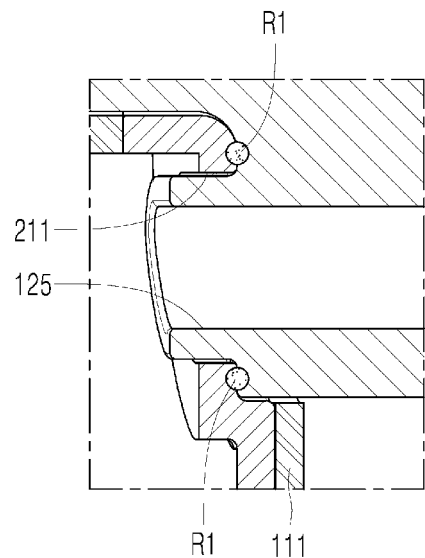
[FIG. 9C]
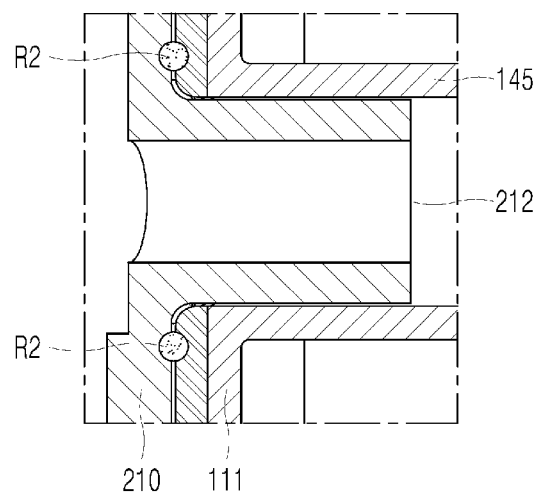

[FIG. 10]
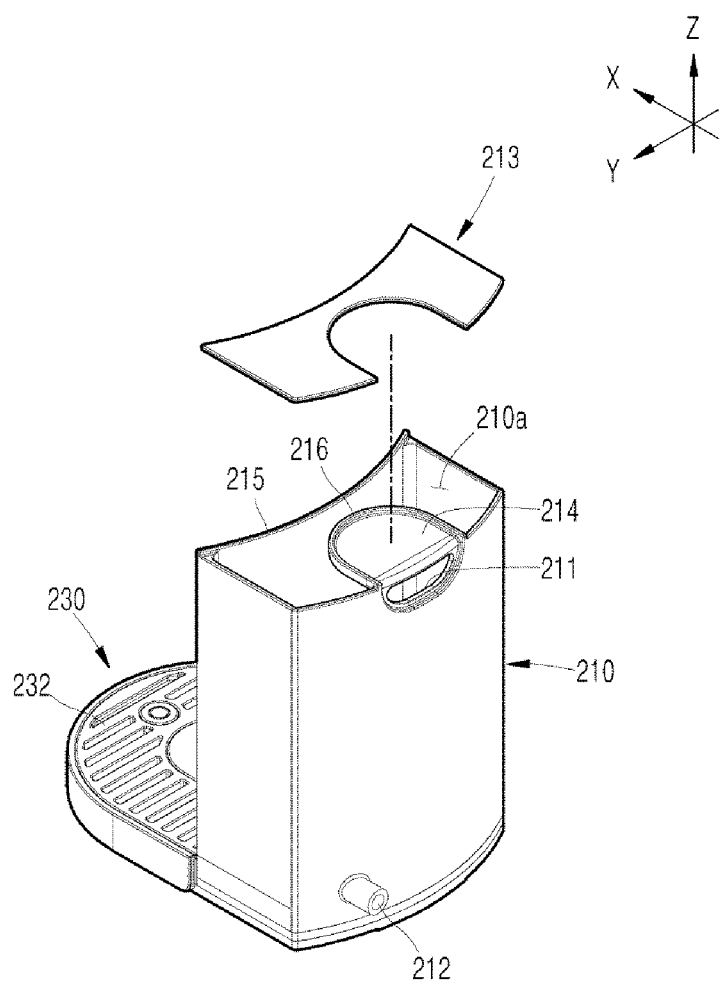

[FIG. 11A]
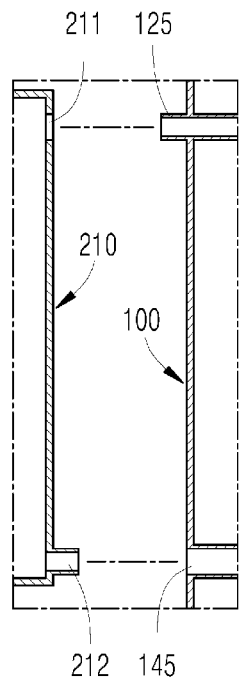
[FIG. 11B]
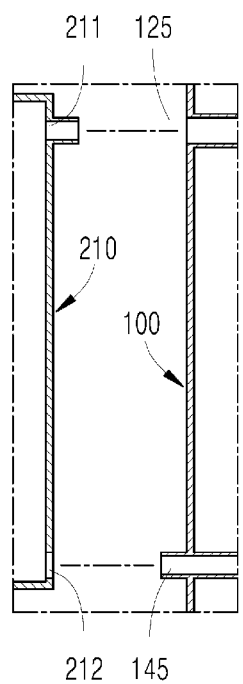

[FIG. 11C]
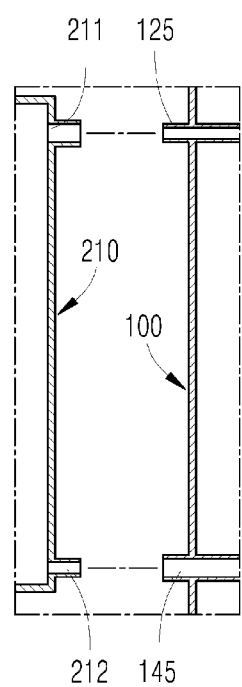

[FIG. 12]
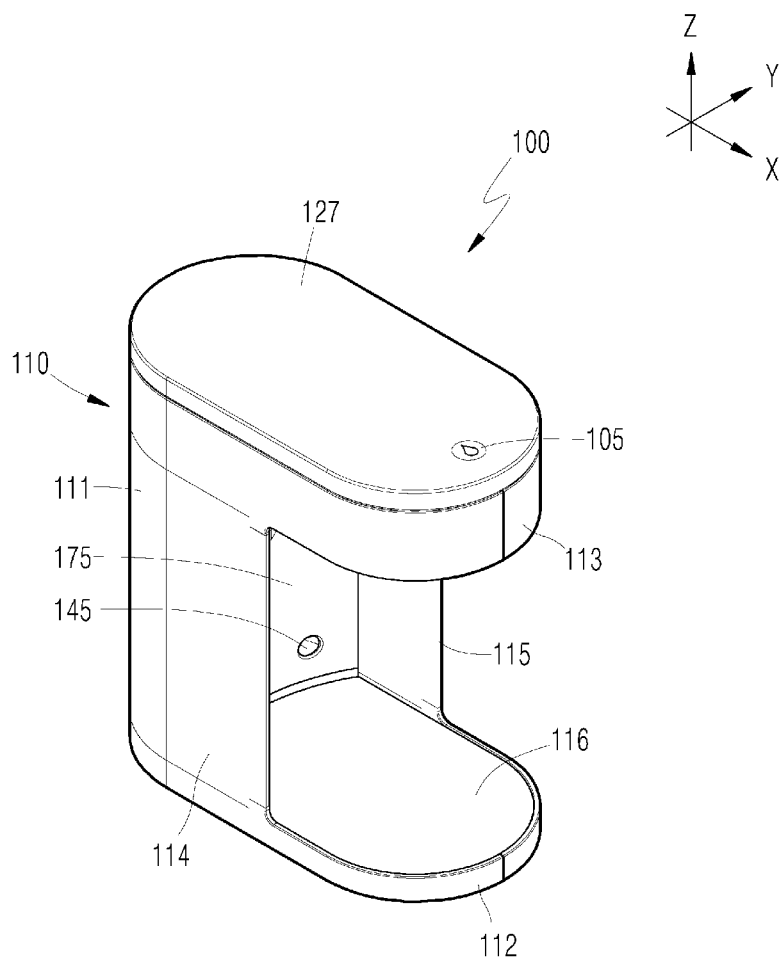

【FIG. 13】
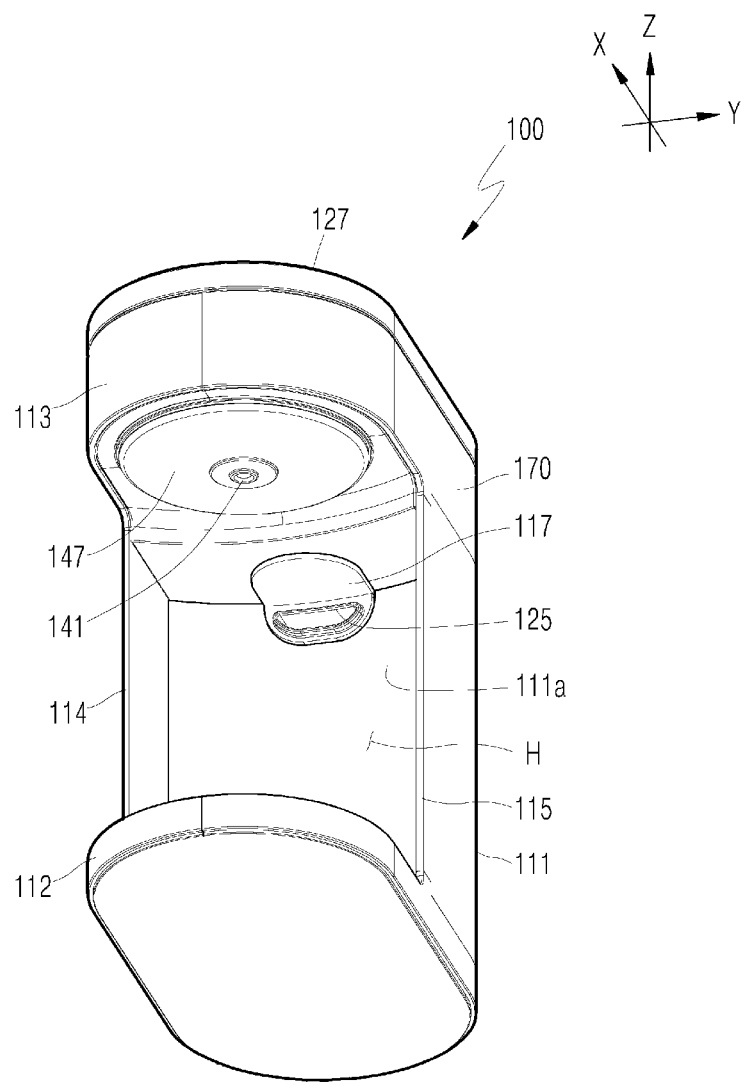

[FIG. 14]
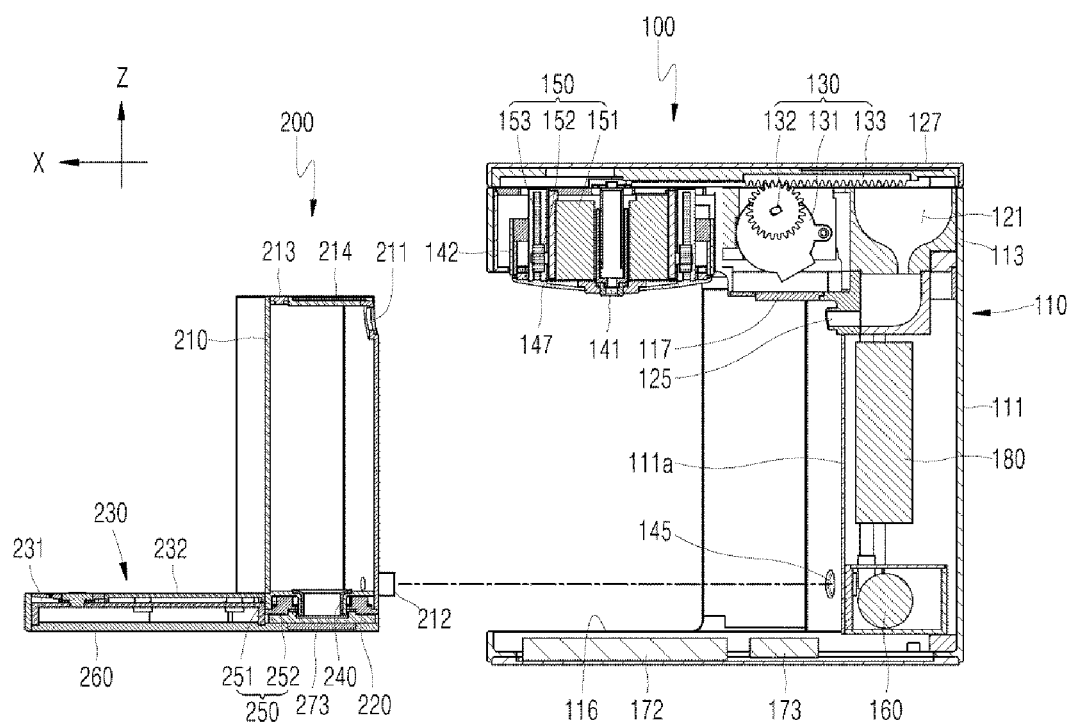

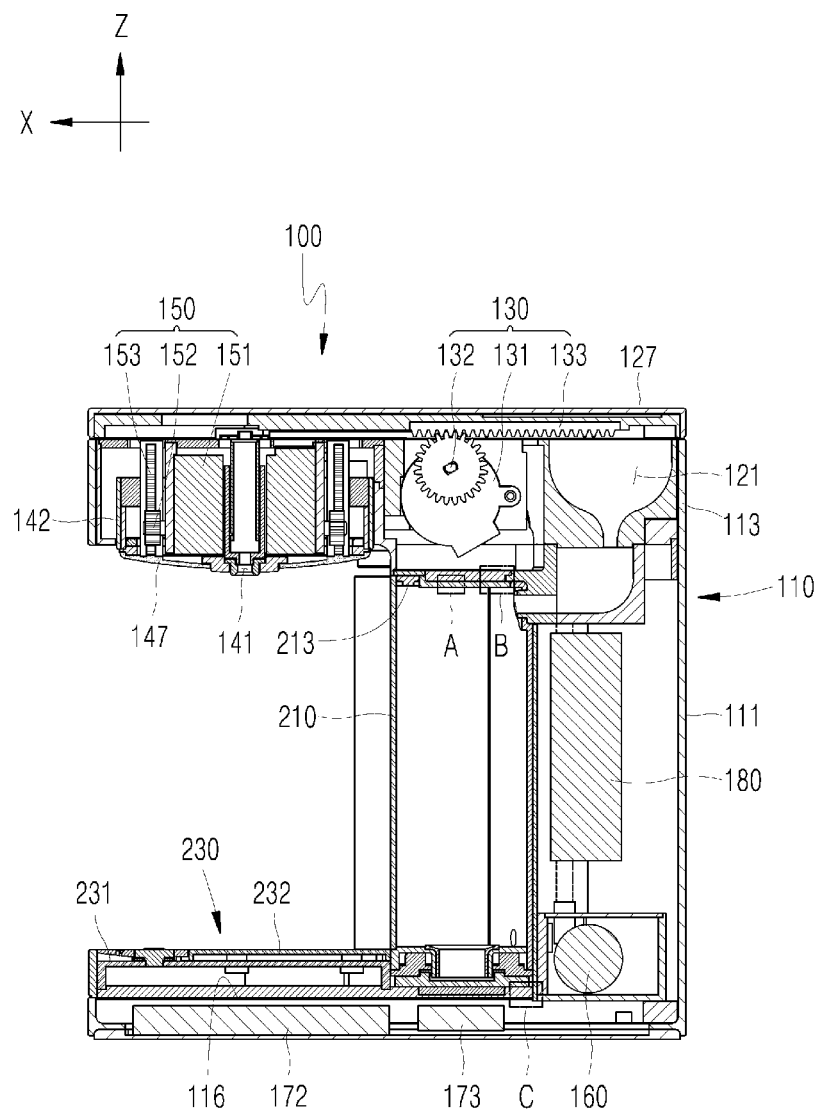
[FIG. 15A]

[FIG. 15B]
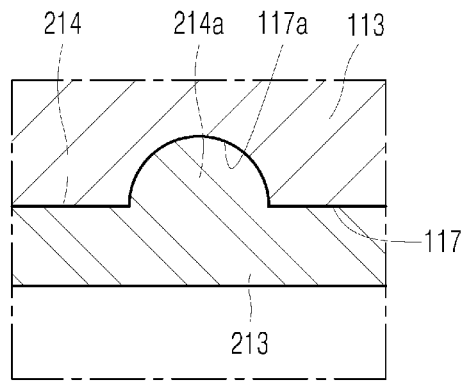
[FIG. 16A]
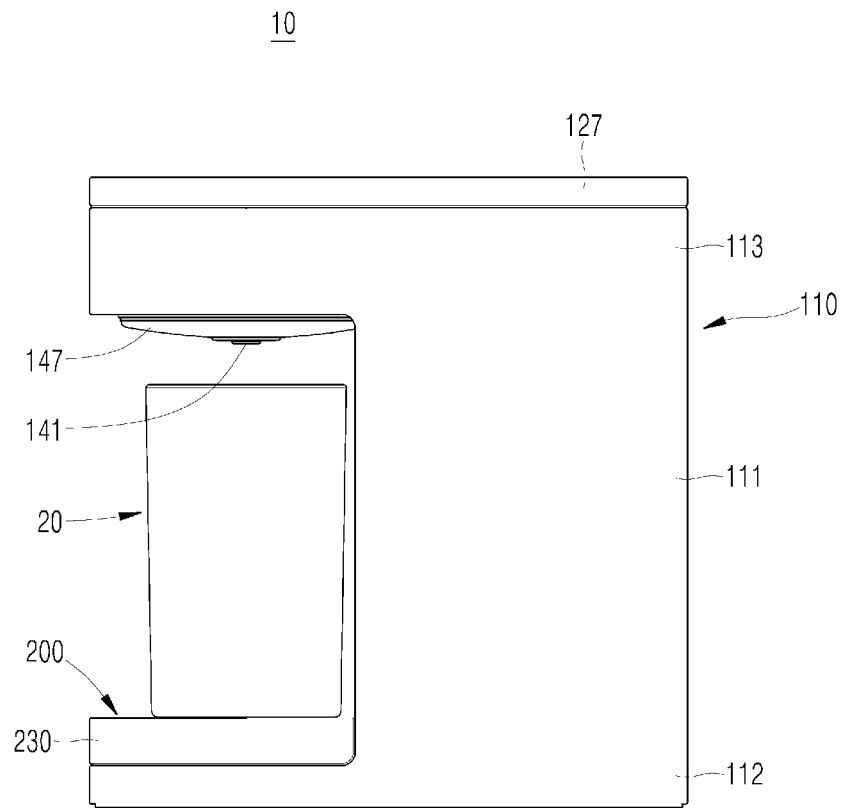

[FIG. 16B]
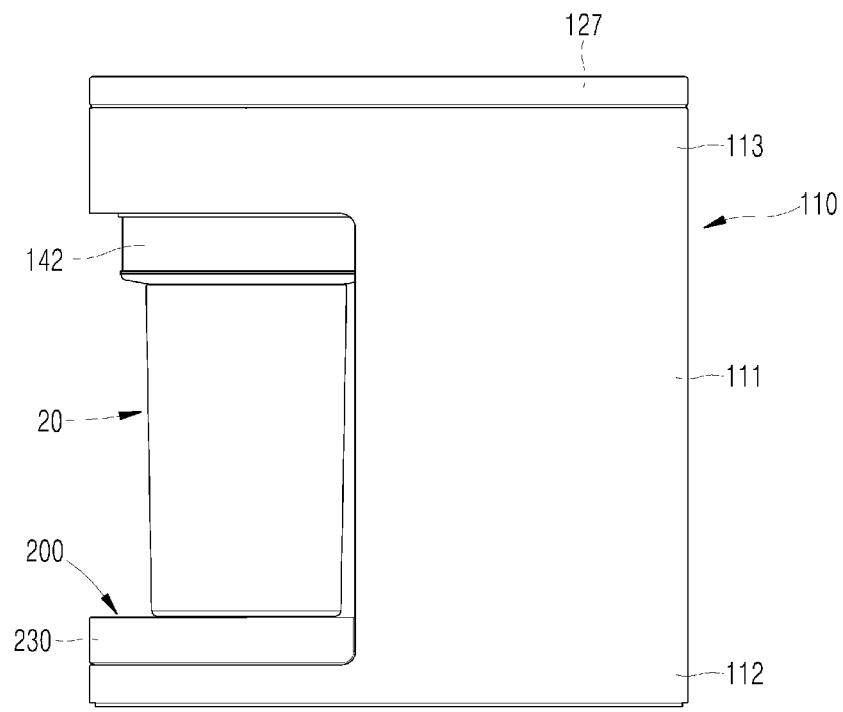

[FIG. 17A]
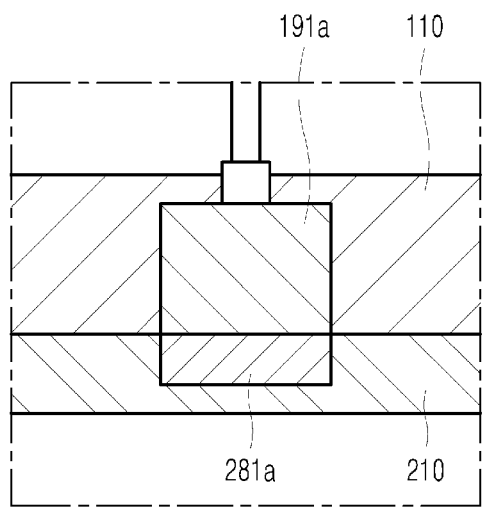
[FIG. 17B]
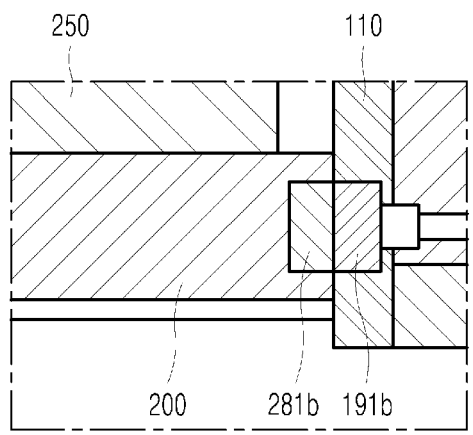

[FIG. 18]
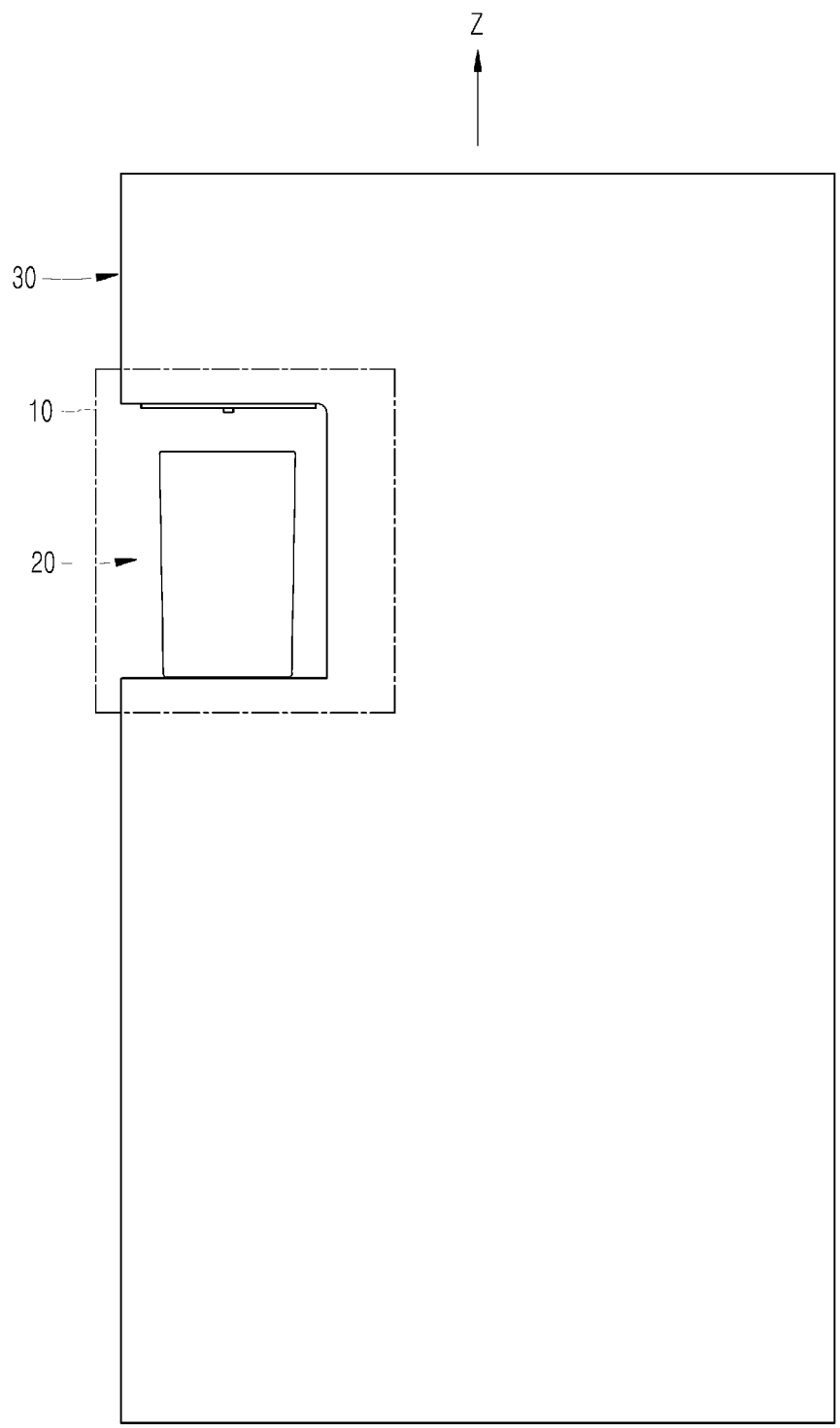

HYDROGEN WATER GENERATOR

CROSS-REFERENCE TO RELATED APPLICATIONS

This application claims the benefit of priority to Korean Patent Application Nos. 10-2019-0056375 filed on May 14, 2019 and 10-2019-0083291 filed on Jul. 10, 2019 with the Korean Intellectual Property Office, the entire contents of which are incorporated herein by reference.

FIELD OF THE DISCLOSURE

The present disclosure relates to a hydrogen water generator, and to a hydrogen water generator that generates hydrogen water and discharges hydrogen water.

BACKGROUND

Hydrogen water is water in which hydrogen molecules (11:2) are dissolved, and with interest in hydrogen water in recent years, interest in hydrogen water generators for producing hydrogen water is increasing.

Hydrogen water generators may include a water bucket or a water tank for storing water (or hydrogen water). Water buckets or water tanks should be easily cleaned, and accordingly, some conventional hydrogen water generators have a structure in which the water tank may be separated from the hydrogen water generator.

For example, Korean Patent No. 1810149 discloses a hydrogen water generator that includes a water tank, a seating part, an electrolyzer, a transfer pump, an outlet, and a branch pipe, where when the water in the water tank flows to the electrolyzer, the water is electrolyzed in the electrolyzer and converted into hydrogen water. Hydrogen water produced in the electrolyzer is fed back to the water tank. In the hydrogen water generator, in order to replenish supply water, it is necessary to open a lid of a container forming the water tank and directly adding water to the container. The supply water is introduced while the water tank is coupled to the housing and the supply of water is directly transferred to the water tank. Since the water tank is directly opened when replenishing supply water, a large amount of hydrogen may easily escape from the hydrogen water if there is hydrogen water previously stored in the water tank.

Furthermore, the water tank is detachably coupled to an upper side of the seating part. since most of the water tank seated on the seating part is exposed to the outside, when an unintentional external force is applied to the water tank, the water tank may be easily separated from the seating part. Also, the water tank should be coupled to the seating part correctly. If a position or direction of the water tank with respect to the seating part is not correct, the coupling between the water tank and the seating part will not be properly made. In addition, the container of the water tank is formed in a cylindrical shape, and since the means for guiding the correct direction and position of the water tank are not disclosed, great care may be required by the user to couple the water tank onto the seating part, which may cause inconvenience to the user. Also, the water tank and the two side flow paths (hereinafter referred to as "connection flow paths") are connected, but since the connection flow paths are covered by the water tank and the seating part and are not visible from the outside, it may be difficult to check whether the connection between the two connection flow paths have been properly made.

Another example of a hydrogen water generator may be found in Korean Patent No. 1677600, which discloses a sterilizing apparatus in which a hydrogen water generator is attachable and detachable. The hydrogen water generator for generating hydrogen water using a power source supplied to the sterilizing apparatus is mounted on a seating plate, and an electrode module for generating hydrogen water is integrally formed with the hydrogen water generator. This example is structurally different from the prior example in that the user directly opens the lid of the container and tilts the hydrogen water generator to pour hydrogen water into a cup. However, even in this hydrogen water generator, in order to replenish the supply water, the lid should be opened from the container and the supply water is added directly to the container. If the supply water is supplied to the sterilizing apparatus in combination with the hydrogen water generator, the supply water is transferred directly to the hydrogen water generator. Since the container is directly opened when supplying the supply water, a large amount of hydrogen may be easily lost if hydrogen water is generated and stored in advance in the container.

Also, the hydrogen water generator is configured such that only a lower end portion of the hydrogen water generator is seated on the seating plate, so that when even a small unintentional external force is applied to the hydrogen water generator, the hydrogen water generator and the seating plate may be easily separated. In addition, the lid for opening and closing the upper side of the hydrogen water generator is exposed to the outside in a state that the hydrogen water generator is seated on the seating plate, and thus the lid may be easily separated from the container, and loss of hydrogen from the hydrogen water may occur.

SUMMARY

One aspect is to provide a water tank that is coupled to the body of the hydrogen water generator by simply pushing the water tank into the body of the hydrogen water generator.

Another aspect is to provide a hydrogen water generator that prevents unintentional separation of the water tank from the body while guiding the coupling of the water tank to the body.

Another aspect is to provide a hydrogen water generator that may minimize the escape of hydrogen from the hydrogen water when the water tank is separated from the body.

Another aspect is to provide a structure that may be made through the body to replenish the water in the water tank, where the water tank assembly which includes the water tank and the electrode module, which when coupled to or separated from the body, the hydrogen water generator has a structure in which the pipelines of the pipe are coupled quickly and accurately and separated quickly and accurately.

Another aspect is to provide a water tank that remains in the body even if the impact is applied from the outside.

Another aspect is to provide a water tank where the lid that covers a top of the water tank remains secure.

Another aspect is to provide a hydrogen water generator that automatically detects the connection of the water tank and the body when the water tank is coupled to the body.

Another aspect is to provide a hydrogen water generator that automatically detects the disconnection of the water tank from the body when separating the water tank from the body.

The disclosure describes a hydrogen water generator that includes a body including a first outlet coupled to a first inlet for receiving supply water, and a second inlet coupled to a second outlet, the second outlet for discharging hydrogen water, a water tank assembly detachably attached to the body, the water tank assembly including a water tank and an electrode module coupled to the water tank, and the water tank including a third inlet and a third outlet. When the water tank assembly is attached to the body, the third inlet of the water tank couples to the first outlet of the body, and the third outlet of the water tank couples with the second inlet of the body.

BRIEF DESCRIPTION OF THE DRAWINGS

FIG. 1 is a cross-sectional view schematically showing a main body and a water tank assembly separated from each other in a hydrogen water generator according to an embodiment of the present invention. In FIG. 1, the main body and the water tank assembly are shown in a separated state.

FIGS. 2A and 2B are schematic cross-sectional views of the main body and the water tank assembly shown in FIG. 1 showing how the water tank assembly is coupled to the main body.

FIG. 3 is a cross-sectional view schematically showing a water tank assembly according to another embodiment of the present invention.

FIG. 4 is a cross-sectional view schematically showing an electrode module according to another embodiment of the present invention.

FIG. 5A is a perspective view of a hydrogen water generator according to another embodiment of the present invention. In FIG. 5A, a water container is shown with the hydrogen water generator.

FIG. 5B is a perspective view showing a state in which a top plate is moved forward in the hydrogen water generator of FIG. 5A.

FIG. 6 is a perspective view showing a separated state of a main body and a water tank assembly of the hydrogen water generator of FIG. 5A.

FIGS. 7A, 7B, and 7C are views schematically showing a guide surface and a bottom portion of the water tank assembly according to embodiments of the present invention. In FIGS. 7A, 7B, and 7C, for convenience of description, the water tank assembly is shown spaced apart from the guide surface.

FIGS. 8A-8H are views schematically showing a portion of a water tank assembly and a main body according to still other embodiments of the present invention.

FIG. 9A is a side cross-sectional view showing a separation state of a main body and a water tank assembly of a hydrogen water generator according to another embodiment of the present invention.

FIG. 9B is a cross-sectional view showing a coupling state between a third inlet and a first outlet of the hydrogen water generator according to the embodiment of the present invention.

FIG. 9C is a cross-sectional view showing a coupling state between a third outlet and a second inlet of the hydrogen water generator according to the embodiment of the present invention.

FIG. 10 is a perspective view showing a state in which a lid is separated from the water tank assembly of the hydrogen water generator of FIG. 6.

FIGS. 11A, 11B, and 11C are views schematically showing a first outlet, a second inlet, a third inlet, and a third outlet in a hydrogen water generator according to another embodiment of the present invention.

FIGS. 12 and 13 are perspective views showing the main body of the hydrogen water generator of FIG. 5A.

FIG. 14 is a side cross-sectional view showing a separation state of the main body and the water tank assembly of the hydrogen water generator of FIG. 5A.

FIG. 15A is a side cross-sectional view showing an engaged state of the main body and the water tank assembly of the hydrogen water generator.

FIG. 15B is an enlarged view of portion A of FIG. 15A.

FIGS. 16A and 16B are side views showing an operation of the hydrogen water generator according to the embodiment of the present invention.

FIG. 17A is an enlarged view of portion B of FIG. 15A.

FIG. 17B is an enlarged view of portion C of FIG. 15A.

FIG. 18 is a view showing a hydrogen water generator according to an embodiment of the present invention integrated with an appliance.

DETAILED DESCRIPTION OF THE PREFERRED EMBODIMENTS

Hereinafter, preferred embodiments of the present invention will be described in detail with reference to the accompanying drawings. In the drawings, like numbers may refer to like elements. Further, in describing the embodiments, descriptions of already known functions or configurations may be omitted as not obscure the disclosure of the embodiments.

X, Y and Z directions shown in the drawings for explaining the embodiments of the present invention are directions perpendicular to each other. Further, a front direction is a direction parallel to the X direction or the X direction, a left direction is a direction parallel to the Y direction or the Y direction, and an upper direction is a direction parallel to the Z direction or the Z direction.

FIG. 1 is a cross-sectional view schematically showing a main body 100 and a water tank assembly 200 separated from each other in a hydrogen water generator 10 according to an embodiment of the present invention. FIGS. 2A and 2B are schematic cross-sectional views of the main body 100 and the water tank assembly 200 shown in FIG. 1 showing how the water tank assembly 200 is coupled to the main body 100.

The hydrogen water generator 10 according to the embodiment of the present invention, is a device for generating and discharging hydrogen water, which is water in which hydrogen molecules are dissolved, and comprises the main body 100 and the water tank assembly 200. The hydrogen water generator 10 according to the embodiment of the present invention may be formed as an independent device. Alternatively, the hydrogen water generator 10 according to the embodiment of the present invention may form part of another apparatus 30 as shown in FIG. 18. For example, the hydrogen water generator 10 may be coupled to a water purifier or a refrigerator, and the like, to form part of the water purifier or the refrigerator, and the like. That is, the main body 100 of the hydrogen water generator 10 may be integrally formed with an apparatus 30 such as the water purifier or the refrigerator, and the like.

The main body 100 and the water tank assembly 200 may be separated and coupled to each other, and the water tank assembly 200 may be detachable from the main body 100 by a sliding movement of the water tank assembly 200 with respect to the main body 100. The main body 100 and the water tank assembly 200 may be washed, repaired, or maintained in a separated state from each other. The main body 100 may include a first inlet 121, a first outlet 125, a second outlet 141, and a second inlet 145. The main body 100 may be provided with a water pump 160 and a guide surface 116. The first inlet 121 may form a conduit 120 through which supply water may flow into the hydrogen water generator 10, in particular, the main body 100. The water may be supplied through the first inlet 121, and the supply water may correspond to water before hydrogen water is generated. The first outlet 125 may be coupled to the first inlet 121. The first outlet 125 may be located below the first inlet 121. The first inlet 121 and the first outlet 125 may be a single pipe line. The first inlet 121 may form the inlet of the conduit 120, and the first outlet 125 may form the outlet of the conduit 120.

The conduit 120 coupling the first inlet 121 and the first outlet 125 may have various shapes, sections, or sizes within a range forming a passage through which water moves. The conduit 120 may be formed in the form of a tube or pipe or a plurality of tubes or pipes. The first outlet 125 may be configured such that an end thereof faces in a horizontal direction. For example, the first outlet 125 may be configured such that the open direction of the end portion faces the front side. The second outlet 141 forms a pipe through which water is discharged to the outside of the hydrogen water generator 10. The second inlet 145 may be coupled with the second outlet 141. The second inlet 145 may be located below the second outlet 141. The second inlet 145 and the second outlet 141 may be coupled to each other through one pipeline 140. The second inlet 145 may form the inlet of the conduit 140 and the second outlet 141 may form the outlet of the conduit 140. The conduit 140 coupling the second inlet 145 and the second outlet 141 may have various shapes, sections, and sizes within a range forming a passage through which water moves. The conduit 140 may be formed in the form of a tube or pipe or a plurality of tubes or pipes. The second inlet 145 may be configured such that the open direction of the end thereof faces the horizontal direction. The second inlet 145 is open in a direction whose end is parallel to the first outlet 125. For example, the second inlet 145 may be configured such that its end faces forward.

The water pump 160 may be configured as a pump for pumping fluid, and may be configured to pump water introduced into the second inlet 145 toward the second outlet 141. The water pump 160 may be coupled to the second inlet 145 by a conduit and may also be coupled to the second outlet 141 by a conduit. The water pump 160 may be formed on the conduit 140. The guide surface 116 may be located below the second outlet 141 and may form an exposed surface when viewed from above. That is, the surface of the guide surface 116 may face upward. The guide surface 116 may be made elongated along the horizontal direction, that is, it may be made elongated along the front-rear direction.

The water tank assembly 200 includes a water tank 210 and an electrode module 220.

The water tank 210 may be in the form of a container that may accommodate water therein. The water tank 210 may be made such that at least a portion thereof is transparent or translucent. A third inlet 211 and a third outlet 212 may be formed in the water tank 210. The third inlet 211 may form an inlet through which water flows into the water tank 210, and the third outlet 212 may form an outlet through which water flows out of the water tank 210. The third inlet 211 may be configured such that the open direction of the end portion thereof faces the horizontal direction. The third inlet 211 may face the first outlet 125. When the end portion of the first outlet 125 faces forward, the end portion of the third inlet 211 faces rearward, and the third inlet 211 may be formed at the rear side of the water tank 210. The third outlet 212 may be configured such that the open direction of the end portion thereof faces the horizontal direction. The third outlet 212 faces the second inlet 145 and is parallel to the third inlet 211. When the end of the second inlet 145 is facing forward, the end of the third outlet 212 may face backward, where the third outlet 212 may be formed at the rear side of the water container 210.

In the hydrogen water generator 10 according to the embodiment of the present invention, the water tank assembly 200 is coupled to the main body 100 when the water tank assembly 200 is moved horizontally towards the main body 100. The water tank assembly 200 is coupled to the main body 100 when slidingly moved in the horizontal direction, and also separated from the main body 100 when slidingly moved in the opposite direction to the coupling direction. The water tank assembly 200 may be placed on the guide surface 116 of the main body 100 before the water tank assembly 200 is slidingly moved in the horizontal direction. In this state, the user may push the water tank assembly 200 so that the water tank assembly 200 moves along the guide surface 116, whereby the coupling between the water tank assembly 200 and the main body 100 is achieved. In this case, the first outlet 125 is coupled to the third inlet 211 and the second inlet 145 is coupled to the third outlet 212. Thereafter, the water supplied through the first inlet 121 is discharged through the first outlet 125, and the water discharged through the first outlet 125 is introduced into the water tank 210. When the discharge of hydrogen water inside the water tank 210 is required, the water pump 160 pumps the hydrogen water stored in the water tank 210 toward the second outlet 141. After passing through the third outlet 212 and the second inlet 145, the hydrogen water is discharged to the outside through the second outlet 141.

In the hydrogen water generator 10 according to the embodiment of the present invention, when the water tank assembly 200 is seated on the guide surface 116 of the main body 100 and when slide, the third inlet 211 is coupled to the first outlet 125 and the third outlet 212 is coupled to the second inlet 145. Therefore, the water tank 210 is coupled to the main body 100 while the pipe of the main body 100 and the water tank 210 are coupled by simply pushing the water tank 210 in one direction (for example, the rear side) without having to hold the water tank 210.

FIG. 3 is a cross-sectional view schematically showing a water tank assembly 200 according to another embodiment of the present invention. FIG. 4 is a cross-sectional view schematically showing an electrode module 220 according to another embodiment of the present invention.

The water tank assembly 200 includes an electrode module 220. The water tank assembly 200 may include a channel 240 and a temperature control module 250. The electrode module 220 is configured to generate hydrogen water by electrolyzing water. In the embodiment of the present invention, the electrode module 220 is for generating hydrogen water and may be referred to as a "hydrogen water generating module". The electrode module 220 may be coupled to a lower side of the water tank 210, and a space 206 in which the electrode module 220 is located is in communication with an internal space 205 of the water tank 210. Therefore, the water contained in the water tank 210 is in contact with the electrode module 220, and when the hydrogen is generated by the operation of the electrode module 220, is to increase the concentration of dissolved hydrogen in the water inside the water tank 210 is increased.

The electrode module 220 includes a pair of electrodes (a first electrode 222 and a second electrode 223). The first electrode 222 and the second electrode 223 form different poles. For example, when the first electrode 222 is a cathode, the second electrode 223 is an anode. The electrode module 220 may include a case 221 having a plurality of holes 221a and 221b formed therethrough and forming a predetermined internal space. The first electrode 222 and the second electrode 223 may be supported by the case 221, and at least a part thereof may be accommodated in the inner space of the case 221. The electrode module 220 may include a diaphragm 224 (ion separation membrane) disposed between the first electrode 222 and the second electrode 223. The first electrode 222 may be made of an electrically conductive metal, and for example, may be made of a metal plate, and may be in the form of a porous plate having a plurality of holes 222a formed therethrough. The second electrode 223 may also be made of an electrically conductive metal, and, for example, may be made of a metal plate, and may be made of a porous plate having a plurality of holes 223a formed therethrough. The diaphragm 224 may be made of a polymer film, and may be made of a silicon material. When current is supplied to the first electrode 222 and the second electrode 223, water is electrolyzed and hydrogen is generated at the electrode of any one of the first electrode 222 and the second electrode 223 and oxygen is generated at the other electrode.

The electrode module 220 described in the embodiment of the present invention may be formed in various ways capable of generating hydrogen by electrolysis in water. The electrode module 220 may be a conventional electrode module for generating hydrogen water.

The channel 240 couples the water tank 210 and the electrode module 220, and may be a passage like a longitudinal tube. The water contained in the water tank 210 may contact the electrode module 220 through the channel 240. The hydrogen water generated by the electrode module 220 moves into the water tank 210 through the channel 240.

The temperature control module 250 may be configured to lower the temperature of the water tank 210, and may be provided around the channel 240. The temperature control module 250 may include a heat absorbing fin 251 and a thermoelectric element 252. The heat absorbing fin 251 may be in contact with the bottom surface of the water tank 210, and made of a high thermal conductivity metal. The heat absorbing fin 251 may be made of a plurality of separated metal fins. The thermoelectric element 252 may be coupled to the heat absorbing fin 251. The thermoelectric element 252 may be formed as a conventional thermoelectric element exhibiting a Peltier effect, so that the endothermic effect occurs on the endothermic fin 251. Temperature control module 250 may be operated by the control of the controller 180 to be described later. The water tank 210 may include a temperature sensor. The controller 180 may operate the temperature control module 250 when the temperature rises inside the water tank 210.

FIG. 5A is a perspective view showing a hydrogen water generator 10 according to another embodiment of the present invention, and FIG. 5B is a perspective view showing a state in which a top plate 127 is moved forward in the hydrogen water generator 10 of FIG. 5A. FIG. 6 is a perspective view showing a separated state of the main body 100 and the water tank assembly 200 of the hydrogen water generator 10 of FIG. 5A. FIGS. 7A, 7B, and 7C are views schematically showing a guide surface 116 and a bottom portion of the water tank assembly 200 according to another embodiment of the present invention. FIGS. 8A-8H are views schematically showing a portion of a water tank assembly and a main body according to another embodiment of the present invention.

Hereinafter, in describing the hydrogen water generator 10 according to the embodiment of the present invention, having the main body 100 as the reference, the front side (X direction) is from which the water tank assembly 200 is separated from the main body 100 and the opposite side (the side in which the water tank assembly is coupled to the main body) will be referred to as the back side.

The main body 100 may be provided with an operation button 105 for operation of the hydrogen water generator 10, and the user may operate the hydrogen water generator 10 by pressing the operation button 105. The operation button 105 may form a configuration of an input unit to be described later. The main body 100 may include a body 110. The body 110 may form an overall appearance of the main body 100, and may also form a structure of the main body 100. In the hydrogen water generator 10 according to the embodiment of the present invention, the body 110 may include a central body 111, a lower body 112, and an upper body 113. The central body 111 forms a central portion of the body 110. The lower body 112 extends forward from the lower end of the central body 111 to protrude forward, and the upper body 113 extends forward from the upper end of the central body 111 to protrude forward. The degree to which the lower body 112 protrudes forward with respect to the center body 111 is similar to, the same as, or greater than the degree to which the upper body 113 protrudes forward with respect to the center body 111. Accordingly, the main body 100 may achieve a stable structure. By being made in such a form, the body 110 may form a C-shape that is generally opened toward the front when viewed from the side.

In the hydrogen water generator 10 according to the embodiment of the present invention, an upper surface of the lower body 112 may form a guide surface 116. The guide surface 116 may be of a planar shape or may be of a curved shape. The guide surface 116 may have a constant cross section along the front-rear direction. A bottom surface 260 of the water tank assembly 200 seated on the guide surface 116 may also have a constant cross section along the front-rear direction. The guide surface 116 may be formed in a symmetrical shape. The water tank assembly 200 seated on the guide surface 116 may also be formed in a symmetrical shape. The guide surface 116 and the bottom surface 260 of the water tank assembly 200 seated on the guide surface 116 may be formed in a form corresponding to each other, and thus the entire bottom surface 260 of the water tank assembly 200 may be in close contact with the guide surface 116.

The guide surface 116 may be made flat along the front-rear and left-right directions. That is, the guide surface 116 may be made flat along the horizontal direction (see FIG. 7A). The guide surface 116 may be formed in a convex shape in the center portion (see FIG. 7B), or may be formed with one or more portions protruding or recessing along the front-rear direction (see FIG. 7C). The water tank assembly 200 may be seated on the guide surface 116 and then slide backward to be coupled to the main body 100. The water tank assembly 200 may be separated from the main body 100 by sliding forward in the state coupled with the main body 100.

In an embodiment of the present invention, the body 110 may include a first sidewall 114 and a second sidewall 115. The first side wall 114 couples the central body 111, the lower body 112, and the upper body 113. The second sidewall 115 couples the central body 111, the lower body 112, and the upper body 113, and is spaced apart from the first sidewall 114. The first sidewall 114 and the second sidewall 115 may be formed in various ways capable of supporting at least a portion of the water tank 210 while the water tank 210 slides forward and backward therebetween. The first side wall 114 and the second side wall 115 may each have a plate shape. The first sidewall 114 and the second sidewall 115 may have a constant cross section along the front-rear direction. Inner side surfaces of the first sidewall 114 and the second sidewall 115 may be made constant along the front-rear direction. The inner side surface of the first side wall 114 may be made flat along the front-rear direction and the up-down direction, and the inner side surface of the second side wall 115 may also be made flat along the front-rear direction and the up-down direction. The first sidewall 114 and the second sidewall 115 may be spaced apart from each other and each inner side surface may be parallel to each other.

In a state in which the main body 100 and the water tank assembly 200 are coupled to each other, the inner side surface 114a of the first sidewall 114 may be formed to correspond to the opposite surface 217 of the water tank 210 (See FIGS. 8B, 8C, 8D, 8F, 8G, and 8H). For example, at least a portion of the inner side 114a of the first sidewall 114 is convex. In this case, the surface 217 of the water tank 210 facing the surface may be concave. Alternatively, in a state in which the main body 100 and the water tank assembly 200 are coupled, a protrusion 114b protruding from the inner surface 114a of the first sidewall 114 may face the surface 217 facing the water tank 210 and make contact (see FIGS. 8A and 8E). In a state in which the main body 100 and the water tank assembly 200 are coupled to each other, the inner side surface 115a of the second sidewall 115 may also be formed to correspond to the opposite surface 218 of the water tank 210 (See FIGS. 8B, 8C, 8D, 8F, 8G, and 8H). For example, at least a portion of the inner side 115a of the second sidewall 115 is convex. In this case, the surface 218 of the water tank 210 facing the surface may be formed concave. Alternatively, in a state in which the main body 100 and the water tank assembly 200 are coupled to each other, the protrusion 115b protruding from the inner surface 115a of the second sidewall 115 may face the face 218 of the water tank 210 and make contact (see FIGS. 8A and 8E).

The body 110 may be provided with an insertion space H. In the hydrogen water generator 10 according to the embodiment of the present invention, a space between the central body 111, the lower body 112, the upper body 113, the first sidewall 114, and the second sidewall 115 may be referred to as the insertion space H.

As shown in FIG. 5A and FIG. 6, in the hydrogen water generator 10 according to the embodiment of the present invention, the insertion space H may correspond to the space in which the water tank 210 of the water tank assembly 200 is inserted into the body 110, and may be in the form of an opening forward on the guide surface 116 of the lower body 112. In the hydrogen water generator 10 according to the embodiment of the present invention, the water tank 210 may be generally formed in a hexahedral shape, and a left side 218 and a right side 217 may be formed in parallel with each other. A rear surface of the water tank 210 may be formed in a shape corresponding to a front surface 111a of the central body 111. When the water tank assembly 200 is seated on the guide surface 116 of the lower body 112 and slide backward, the water tank 210 may be inserted into the insertion space H so as to fit into the first side wall 114 and the second side wall 115. The water tank 210 may be shielded by the central body 111. In addition, the water tank 210 may be shielded by the upper body 113.

In the hydrogen water generator 10 according to the embodiment of the present invention, in the state the water tank 210 is inserted into the insertion space H, the water tank 210 may be in close contact with first side wall 114, the second side wall 115 and the front surface 111a of the central body 111. In this case, the horizontal width of the water tank 210 may be the same as the gap between the first side wall 114 and the second side wall 115. The left side 218 and the right side 217 of the water tank 210 may be parallel in the front-rear direction and parallel in the vertical direction. In addition, the upper surface of the water tank 210 may be shielded by the upper body 113. As such, in the hydrogen water generator 10 according to the embodiment of the present invention, when the water tank 210 is inserted into the insertion space H, the first side wall 114, the second side wall 115 and the central body 111 blocks movement in all directions except for the forward movement, and also the rotational movement is blocked, thereby the water tank 210 may be stably coupled on the main body 100.

The water tank assembly 200 may include a seating part 230. As shown in FIG. 5A, the seating part 230 is a configuration in which a water container 20 is placed on a protrusion projecting forward from the bottom of the water tank 210 and the top surface is made entirely flat. The seating part 230 may have a flat bottom surface. The seating part 230 may have the same size and shape as the front portion of the lower body 112. That is, the front portion of the seating part 230 may be the same as the front portion of the lower body 112 in plan view. When the water tank assembly 200 is coupled to the main body 100, the seating part 230 may be stably coupled with the front portion of the lower body 112, and a coupling with a sense of unity may be achieved. When the main body 100 and the water tank assembly 200 are coupled, the seating part 230 is positioned below the second outlet 141 and exposed to the outside of the main body 100 when viewed from the side. Therefore, the water tank 210 of the water tank assembly 200 may be stably supported by the main body 100, and when the water tank assembly 200 is withdrawn from the main body 100, the water tank assembly 200 may be gripped by the seating part 230.

FIG. 9A is a side cross-sectional view showing a separation state of a main body 100 and a water tank assembly 200 of a hydrogen water generator 10 according to another embodiment of the present invention, and FIG. 9B is a cross-sectional view showing a coupling state between a third inlet 211 and a first outlet 125 according to the embodiment of the present invention, and FIG. 9C is a cross-sectional view showing a coupling state between a third outlet 212 and a second inlet 145 according to the embodiment of the present invention.

FIG. 10 is a perspective view showing a state in which a lid 213 is separated from the water tank assembly 200 of the hydrogen water generator 10 of FIG. 6. FIGS. 11A, 11B, and 11C schematically shows a first outlet 125, a second inlet 145, a third inlet 211, and a third outlet 212 in the hydrogen water generator 10 according to another embodiment of the present invention.

The first outlet 125 may be opened forward from the front surface 111a of the central body 111. An end portion of the first outlet 125 may be formed at a relatively upper point on the front surface 111a of the central body 111. In the hydrogen water generator 10 according to the embodiment of the present invention, an end portion 121a of the first inlet 121 is positioned higher than the first outlet 125, and the water introduced into the first inlet 121 flows to the first outlet 125 due to gravity. The second outlet 141 may be exposed at the bottom of the upper body 113, and through the second outlet 141, water including hydrogen (hydrogen water) generated by the hydrogen water generator 10 may be discharged and filled into the water container 20. The second inlet 145 may be formed at a relatively lower point on the front surface 111a of the central body 111 and may also be formed at a lower point than the second outlet 141. The hydrogen water pumped by the water pump 160 flows toward the second outlet 141, and as shown in FIG. 5A, the hydrogen water is discharged through the second outlet 141 to fill the water container 20 placed on the seating part 230.

The above-described seating part 230 may include a seating panel 231 and a seating plate 232. The seating panel 231 is coupled to the lower end of the water tank 210. The seating plate 232 may be seated on an upper surface of the seating panel 231. The seating plate 232 forms a seating surface on which the water container 20 is placed. The seating plate 232 may be provided with a plurality of holes 232a through which water passes through. Accordingly, even if water is accidentally spilled onto the seating plate 232, the water may be collected in the seating panel 231 through the holes 232a of the seating plate 232.

As shown in FIG. 10, in the embodiment of the present invention, the third inlet 211 may be formed relatively upward and the third outlet 212 may be formed relatively downward at the water tank 210. The third inlet 211 may be formed adjacent to the top of the water tank 210, and the third outlet 212 may be formed adjacent to the bottom of the water tank 210. The third inlet 211 and the third outlet 212 are open toward the rear. An opening 210a may be formed above the top of the water tank 210, and the lid 213 is seated on the top of the water tank 210 to close the top opening 210a of the water tank 210. Steps 215 and 216 may be formed at an edge of the upper opening 210a of the water tank 210. The steps 215 and 216 may be formed at the front of the upper edge of the water tank 210, and may also be formed at the rear. When two different steps 215 and 216 are provided at the top of the water tank, the two steps 215 and 216 may not be parallel to each other, may form different curved shapes, and may be symmetric when viewed from the front. The lid 213 may be located between the two steps 215 and 216 in a state in which the lid 213 is seated on the top of the water tank 210, and the lid 213 may be positioned by the two steps 215 and 216 such that the horizontal movement and rotation may be constrained. Thus, the user may lift the lid 213 upward from the water tank to open the top opening 210a of the water tank 210.

As shown in FIG. 9A, the first outlet 125 and the third inlet 211 are formed at the same height with respect to the guide surface 116. The first outlet 125 and the third inlet 211 may be formed to be coupled to each other, and when combined, the interior of the first outlet 125 and the interior of the third inlet 211 communicate with each other. For example, the third inlet 211 may be in the form of an opening, and the first outlet 125 may be in the form of a protruding tube fitted into the third inlet 211 (see FIG. 11A). The inner diameter of the third inlet 211 may be about the same size as the outer diameter of the first outlet 125 (in this case, "same size" does not mean the first outlet 125 and the third inlet 211 are physically the same, but the first outlet 125 and the third inlet 211 have a tolerance (tolerance) for mutual coupling).

As shown in FIG. 11B, the first outlet 125 may have an opening, and the third inlet 211 may have a protrusion tube fitted with the first outlet 125. Or, as shown in FIG. 11C, both the third inlet 211 and the first outlet 125 may be a protrusion made of a different diameter so that any one is fitted to the other. As shown in FIG. 9B, an O-ring R1 may be interposed between the third inlet 211 and the first outlet 125 to maintain airtightness between the water tank 210 and the pipeline of the main body 100. The second inlet 145 and the third outlet 212 may be formed at the same height with respect to the guide surface 116. The second inlet 145 and the third outlet 212 may be formed to be coupled to each other, and when combined, the inside of the second inlet 145 and the inside of the third outlet 212 communicate with each other. For example, when the second inlet 145 is in the form of an opening, the third outlet 212 may be in the form of a protruding tube fitted to the second inlet 145 (see FIG. 11A). The inner diameter of the second inlet 145 may be about the same size as the outer diameter of the third outlet 212 (in this case, "same size" does not mean the second inlet 145 and the third outlet 212 are physically the same, but the second inlet 145 and the third outlet 212 have a tolerance (tolerance) for mutual coupling).

As shown in FIG. 11B, the third outlet 212 may have an opening, and the second inlet 145 may have a protrusion tube fitted with the third outlet 212. Alternatively, as shown in FIG. 11C, the second inlet 145 and the third outlet 212 may both be formed in the shape of a protrusion tube, and may have different diameters so that one is fitted to the other. As shown in FIG. 9C, an O-ring R2 may be interposed between the second inlet 145 and the third outlet 212 to maintain airtightness between the water tank 210 and the pipeline of the main body 100.

In the hydrogen water generator 10 according to the embodiment of the present invention, the vertical spacing between the first outlet 125 and the second inlet 145 may be equal to the vertical spacing between the third inlet 211 and the third outlet 212. The relative position of the second inlet 145 with respect to the first outlet 125 may be the same as the relative position of the third outlet 212 with respect to the third inlet 211.

As described above, according to the hydrogen water generator 10 according to the embodiment of the present invention, when the water tank assembly 200 is seated on the guide surface 116 of the main body 100 and slides backward, the third inlet 211 may be coupled to the first outlet 125 and the third outlet 212 may be coupled to the second inlet 145. Therefore, when water is supplied from the main body 100 to the water tank 200, and when the water tank 210 is coupled to the main body 100, the pipes of the water tank 210 and the main body 100 are quickly and accurately coupled. When the water tank 210 is separated from the main body 100, the pipes of the water tank 210 and the main water tank 100 may be quickly separated.

As shown in FIG. 9A, a first terminal 271 may be installed at a lower end of the water tank assembly 200. The first terminal 271 may be electrically coupled to the electrode module 220. The second terminal 171 may be installed at the body 110. The second terminal 171 may be installed at the lower body 112. The second terminal 171 may be electrically coupled to an external power source. Or, the second terminal 171 may be electrically coupled to a battery 172.

When the third inlet 211 is coupled to the first outlet 125, the first terminal 271 and the second terminal 171 may coincide with each other in the longitudinal direction and may be electrically coupled to each other. Therefore, when the third inlet 211 is coupled to the first outlet 125, electricity may be supplied from the main body 100 to the electrode module 220. That is, when the third inlet 211 is coupled to the first outlet 125, the electrode module 220 may be operated.

FIGS. 12 and 13 are perspective views showing the main body 100 of the hydrogen water generator of FIG. 5A.

In the hydrogen water generator 10 according to the embodiment of the present invention, a guide groove 214 may be formed in the water tank 210 (See FIGS. 6 and 10). In particular, the guide groove 214 may be formed on the top surface of the water tank 210. In the embodiment, the guide groove 214 may be formed in a concave groove shaped downward and the bottom surface is formed to continue to the rear end of the water tank 210. A guide protrusion 117 may be formed in the main body 100 in a configuration corresponding to the guide groove 214 (see FIGS. 9A and 13). The guide protrusion 117 may be formed at the bottom surface of the upper body 113 at the rear of the second outlet 141. The guide protrusion 117 may be formed to protrude downward from the bottom of the upper body 113 to be inserted into the guide groove 214 in order to guide the forward and backward movement of the guide groove 214. As shown in FIG. 13, the body 110 may have a guide protrusion 117 that guides the moving direction of the guide groove 214 directly above the first outlet 125. When the water tank 210 enters the insertion space H and slides further to the rear, the guide protrusion 117 is inserted in the guide groove 214 before the third inlet 211 and the first outlet 125 contact each other.

The hydrogen water generator 10 according to the embodiment of the present invention, when viewed from the front, the left and right, the width of the guide groove 214 may be made the same as the left and right width of the guide protrusion 117. The guide groove 214 and the guide protrusion 117 may be formed to have a narrower width toward the front. For example, the guide groove 214 and the guide protrusion 117, as shown in FIGS. 10 and 13, may have the front portion be made in a semi-circular shape. Accordingly, the guide protrusion 117 may be easily inserted in the rear end of the guide groove 214 when moving in the forward direction, and the left and right movement may be prevented when the guide protrusion 117 is being inserted into the guide groove 214. The guide protrusion 117 restrains horizontal movement and rotation of the guide groove 214 in a state where the center lines of the third inlet 211 and the first outlet 125 coincide with each other. In addition, the guide protrusion 117 restrains horizontal movement and rotation of the guide groove 214 in a state where the center line of the third outlet 212 and the second inlet 145 coincide with each other. In this state, when the water tank assembly 200 further slides backward, the third inlet 211 is accurately coupled to the first outlet 125, and the third outlet 212 is accurately coupled to the second inlet 145. In this state, the inner surfaces of the insertion space H constrains the movements except for the forward movement of the water tank 210.

FIG. 14 is a side cross-sectional view showing a separation state of the main body 100 and the water tank assembly 200 of the hydrogen water generator 10 of FIG. 5A, FIG. 15A is a side cross-sectional view showing an engaged state of the main body 100 and the water tank assembly 200, and FIG. 15B is an enlarged view of portion A of FIG. 15A.

As shown in FIG. 14, the water tank assembly 200 may include a bottom plate 260 and a power receiver 273. The bottom plate 260 may form the bottom surface of the water tank assembly 200. The bottom plate 260 may be coupled to the water tank 210 to form a sealed structure, and the bottom plate 260 may be coupled to the seating part 230 to form a sealed structure. The power receiver 273 may be disposed at the bottom plate 260. That is, the power receiver 273 may not be exposed at the bottom of the water tank assembly 200, and may be provided inside the water tank assembly 200 so as not to be exposed to the outside of the water tank assembly 200. The power receiver 273 may be electrically coupled to the electrode module 220. The body 110 may be provided with a power transmitter 173 below the guide surface 116.

In the embodiment of the present invention, the power transmitter 173 may be provided inside the body 110. That is, the power transmitter 173 is not exposed to the outside of the body 110. The power transmitter 173 may be provided inside the body 110. The power transmitter 173 may be electrically coupled to the external power source. The power transmitter 173 may be electrically coupled to the battery 172. The power transmitter 173 and the power receiver 273 may be configured such that power may be wirelessly transmitted from the power transmitter 173 to the power receiver 273, using magnetic induction or magnetic resonance for resonant inductive coupling. That is, a wireless charging method for transmitting power wirelessly may be applied between the power transmitter 173 and the power receiver 273. Since the wireless charging technology is a known technology, a detailed description thereof will be omitted. When the third inlet 211 is coupled to the first outlet 125, the power transmitter 173 and the power transmitter 173 coincide longitudinally. Therefore, when the third inlet 211 is coupled to the first outlet 125, power may be supplied from the main body 100 to the electrode module 220. That is, when the third inlet 211 is coupled to the first outlet 125, for example, the power of the battery 172 may be wirelessly transmitted through the power transmitter 173 to the power receiver 273.

In the hydrogen water generator 10 according to the embodiment of the present invention, when the third inlet 211 is coupled to the first outlet 125, the guide groove 214 and the guide protrusion 117 may form a locking structure with each other. To this end, any one of the bottom surface of the guide groove 214 and the bottom surface of the guide protrusion 117 may include a locking projection 214a protruding to form a curved surface and the locking groove 117a that is inserted into the locking projection 214a may be formed on the other of the bottom surface of the guide groove 214 and the bottom surface of the guide protrusion 117.

For example, as shown in FIG. 15B, a locking protrusion 214a may be formed in the guide groove 214, and a locking groove 117a into which the locking protrusion 214a may be inserted may be formed in the guide protrusion 117. When the guide groove 214 and the guide protrusion 117 form a locking structure with each other, the forward movement of the water tank assembly 200 against the main body 100 is prevented.

As shown in FIG. 15A, when the third inlet 211 is coupled to the first outlet 125, the inner surface of the insertion space H restricts the separation of the water tank 210 and the lid 213. That is, the lid 213 in the insertion space H is prevented from having an upward movement by the body 110. In particular, when the third inlet 211 and the first outlet 125 are coupled to each other, the lid 213 is abutted by the bottom surface of the upper body 113.

In the hydrogen water generator 10 according to the embodiment of the present invention, the guide groove 214 and the guide protrusion 117 may be provided, so that the water tank assembly 200 at the guide surface 116 of the main body 100, when sliding back, may quickly and accurately couple the third inlet 211 to the first outlet 125. In a state in which the water tank assembly 200 is coupled to the main body 100, the guide groove 214 and the guide protrusion 117 form a locking structure with each other, and thus, even if an impact is applied from the outside to the water tank 210, leakage is prevented at the coupled portion of the conduit and the pipe, and the lid 213 may be kept closed.

FIGS. 16A and 16B are side views showing an operation of the hydrogen water generator 10 according to the embodiment of the present invention. The operation of the hydrogen water generator 10 will be described with references to FIGS. 14 and 15A described above.

As shown in FIGS. 14 and 8A, the main body 100 may include an opening and closing part 130, a lifter 150, a controller 180, the battery 172, and the top plate 127. The controller 180 may be a microprocessor, an integrated circuit, an electrical circuit, a logical electrical circuit, and the like. The main body 100 may include an input unit and an output unit. The input unit may include an image input unit, a microphone or audio input unit for inputting an audio signal, and a user input unit (e.g., a touch key, a mechanical key, etc.) for receiving information from a user. The output unit may be used to generate an output related to visual, auditory, or tactile, and may include at least one of a display, an audio output unit, a haptic module, and an optical output unit, etc.

The controller 180 controls the overall operation of the hydrogen water generator 10. The battery 172 supplies power to the electrode module 220, the temperature control module 250, the water pump 160, the controller 180, the lifter 150, and the opening/closing part 130. When the battery 172 is not provided in the hydrogen water generator 10 according to the embodiment of the present invention, the electrode module 220, the temperature control module 250, the water pump 160, the controller 180, the lifter 150, and the opening/closing part 130 may be directly powered by a power supply from the outside.

In the embodiment of the present invention, the first inlet 121 is opened and closed by the top plate 127. The top plate 127 slides in the front-rear direction by operation of the opening/closing part 130 under the control of the controller 180 to open and close the first inlet 121 (See FIG. 5B). The opening/closing part 130 may include a motor 131, a pinion 132, and a rack 133. The motor 131 may be fixedly coupled to the inside of the body 110, and in particular, may be coupled to the inside of the upper body 113. The pinion 132 may be formed in the form of a pinion gear, and the rotation axis of the pinion 132 may be formed in parallel with the left-right direction (Y direction). The rack 133 may be integrally formed on the bottom of the top plate 127 or may be coupled to the bottom of the top plate 127, and teeth may be formed along the front-rear direction (X direction) and may be engaged with the pinion 132. Under the control of the controller 180, when the pinion 132 is rotated by the motor 131, depending on the rotational direction of the motor 131, the rack 133 moves forward and backward so that the top plate 127 coupled with the rack 133 opens or closes the first inlet 121.

As shown in FIGS. 16A and 16B, an elastic member 147 may be formed around the second outlet 141, and a movable body 142 may be formed above the edge of the elastic member 147. The second outlet 141 and the elastic member 147 may be fixed to the movable body 142 and may be made to move up and down together with the movable body 142. When the elastic member 147 is lowered towards the water container 20, the area of the elastic member 147 being made larger than the top opening of the water container 20, covers the top opening of the water container 20. The movable body 142 may be formed in a cylindrical shape as a whole. The movable body 142 may be moved up and down by the operation of the lifter 150 under the control of the controller 180. The lifter 150 may be disposed in the upper body 113, or lowered and exposed to the outside of the upper body 113. The outer surface of the movable body 142 forms a relatively small gap with the upper body 113. Hydrogen water is discharged in the direction of gravity through the second outlet 141. The second outlet 141 may be in a form of a nozzle. The elastic member 147 may be in close contact with the top opening circumference of the water container 20 when the hydrogen water is discharged, and may be formed of a material that may elastically deform, such as silicon and rubber.

As shown in FIGS. 14 and 15A, the lifter 150 is configured to move the moving body 142 coupled to the second outlet 141 and the elastic member 147, and may include the motor 151, the pinion. 152, and the rack 153. The motor 151 may be coupled to the body 110, and in particular may be coupled to the upper body 113. The pinion 152 may be a pinion gear and may be coupled to the rotational shaft of the motor 151. The rotational axis of the motor 151 may be in parallel with the horizontal direction (direction perpendicular to Z direction). The rack 153 may be coupled to the movable body 142. The rack 153 may be formed in an elongated shape in the longitudinal direction (Z direction), and may include a plurality of teeth engaged with the pinion 152 along the longitudinal direction (Z direction). When the motor 151 rotates, the rack 153 is raised or lowered together with the movable body 142. As shown in FIGS. 16A and 16B, when the movable body 142 descends, the elastic member 147 is in close contact with the periphery of the top opening of the water container 20. When the elastic member 147 is in close contact with the periphery of the top opening of the water container 20, the inside of the water container 20 may be sealed except for the second outlet 141.

FIG. 17A is an enlarged view of a portion B of FIG. 15A, and FIG. 17B is an enlarged view of a portion C of FIG. 15A.

As shown in FIG. 17A, a first magnetic body 281*a* may be disposed at the water tank 210, and a magnetic sensor 191*a* may be disposed at the body 110 to detect the first magnetic body 281*a*. The first magnetic body 281*a* may be made of a permanent magnet. The magnetic sensor 191*a* may detect magnetism of the first magnetic body 281*a*, and thereby may detect the coupling between the water tank 210 and the body 110 (for instance, the water tank assembly 200 and the main body 100). When the third inlet 211 is coupled to the first outlet 125, the magnetic sensor 191*a* may detect the first magnetic body 281*a*. The first magnetic body 281*a* and the magnetic sensor 191*a* may be disposed in a pair of two or more, respectively. The pair of first magnetic bodies 281*a* and the magnetic sensors 191*a* may be disposed at positions corresponding to each other. For example, when any one of the first magnetic body 281*a* and the magnetic sensor 191*a* is disposed adjacent to the top of the water tank, the other may be disposed adjacent to the bottom of the body 110. The magnetic sensor 191*a* is coupled to the controller 180, and the detection (sensing) by the magnetic sensor 191*a* is transmitted to the controller 180.

Therefore, when the water tank 210 is coupled to the main body 100, the coupling of the conduit (e.g., first outlet 125, second inlet 145, third inlet 211, and third outlet 212) of the water tank 210 and the main body 100 may be automatically detected, as well as when the water tank 210 is separated from the main body 100, the disconnection of the conduit of the water tank 210 and the main body 100 may be automatically detected. The controller 180 which detects the coupling and uncoupling of the conduit may display a coupling state or a uncoupling state through the output unit, for example, a display.

As shown in FIG. 17B, a second magnetic body 281*b* may be disposed at the water tank assembly 200, and a third magnetic body 191*b* to which the second magnetic body 281*b* may be attracted may be disposed at the main body 100. At least one of the second magnetic body 281b and the third magnetic body 191b may be made of a magnet. The second magnetic body 281b may be made of a permanent magnet or metal. The third magnetic body 191b may be made of metal or may be made of a permanent magnet. The second magnetic body 281b and the third magnetic body 191b may be formed in two or more pairs, respectively. The pair of second magnetic body 281b and the third magnetic body 191b may be formed at positions corresponding to each other, and when any one of the second magnetic body 281b and the third magnetic body 191b is formed adjacent to the side of the water tank assembly, the other may be formed adjacent to the side of the main body. Thus, when the third inlet 211 is coupled to the first outlet 125, the attraction force between the third magnetic body 191b and the second magnetic body 281b acts to ensure a stable coupling of the water tank 210 and the main body 100. Tight coupling between the third inlet 211 and the first outlet 125 and tight coupling between the third outlet 212 and the second inlet 145 may be achieved.

While embodiments of the present disclosure have been described above with reference to the drawings, the present invention is not limited to the above-described embodiments, and it will be apparent to those skilled in the art that the embodiments may be modified without departing from the spirit and scope of the present invention. It will be understood that modifications and variations are possible. Therefore, the scope of the present invention should not be defined by the described embodiments, but should be determined by the technical spirit described in the claims.

What is claimed is:

1. A hydrogen water generator comprising:
   a body including a first outlet coupled to a first inlet for receiving supply water, and a second inlet coupled to a second outlet, the second outlet for discharging hydrogen water;
   a water tank assembly detachably attached to the body, the water tank assembly including a water tank and an electrode module coupled to the water tank, the water tank including a third inlet and a third outlet, wherein when the water tank assembly is attached to the body, the third inlet of the water tank assembly couples to the first outlet of the body, and the third outlet of the water tank couples with the second inlet of the body.

2. The hydrogen water generator of claim 1, wherein the body further comprises a guide surface, wherein the water tank assembly is placed on the guide surface to be slidingly moved to be attached to the body.

3. The hydrogen water generator of claim 2, wherein the body comprises a central body, a lower body, and an upper body,
   the lower body extending from a lower portion of the central body and including the guide surface, and
   the central body including the first outlet and the second inlet.

4. The hydrogen water generator of claim 3, wherein the guide surface is contoured and a bottom surface of the water tank assembly is contoured to correspond with the contoured surface of the guide surface.

5. The hydrogen water generator of claim 3, further comprising:
   a first sidewall coupling the central body, the lower body, and the upper body, and
   a second sidewall coupling the central body, the lower body, and the upper body, wherein an insertion space is formed between the central body, the lower body, the upper body, the first sidewall, and the second sidewall in which the water tank assembly is inserted.

6. The hydrogen water generator of claim 5, wherein the first sidewall and the second sidewall are contoured, and side surfaces of the water tank assembly are contoured to correspond with the respective first sidewall and the second sidewall.

7. The hydrogen water generator of claim 3, further comprising:
   a guide part disposed at a bottom surface of the upper body; and
   another guide part disposed at a top surface of the water tank assembly, wherein the guide part corresponds with the another guide part to guide the water tank assembly when the water tank assembly is moved to attach to the body of the hydrogen water generator.

8. The hydrogen water generator of claim 7, wherein the guide part is a contoured guide protrusion disposed at the upper body; and
   the another guide part is a contoured guide groove corresponding to the contoured guide protrusion and disposed at the water tank of the water tank assembly.

9. The hydrogen water generator of claim 8, wherein the first outlet of the body is disposed at the guide protrusion disposed at the upper body of the hydrogen water generator.

10. The hydrogen water generator of claim 7, further comprising:
    a locking structure to lock the guide part and the another guide part together when the water tank assembly is inserted into the body of the hydrogen water generator.

11. The hydrogen water generator of claim 8, wherein one of the guide groove and the guide protrusion includes a locking projection; and
    an other of the guide groove and the guide protrusion includes a locking groove, wherein the locking projection locks with the locking groove when the guide protrusion is inserted into the guide groove.

12. The hydrogen water generator of claim 1, wherein one of the first outlet of body and the third inlet of the water tank assembly is a protrusion tube and an other one of the first outlet of body and the third inlet of the water tank assembly is an opening, wherein the protrusion tube fits to the opening; and
    one of the second inlet of body and the third outlet of the water tank assembly is another protrusion tube and an other one of the second inlet of body and the third outlet of the water tank assembly is another opening, wherein the another protrusion tube fits to the another opening.

13. The hydrogen water generator of claim 1, wherein the first outlet of body is a protrusion tube that fits with a protrusion tube of the third inlet of the water tank assembly, and
    the second inlet of body is a protrusion tube that fits with a protrusion tube of the third outlet of the water tank assembly.

14. The hydrogen water generator of claim 1, wherein the water tank includes a lid to close a top opening of the water tank,
    wherein a step is disposed at an edge of the top opening in which the lid is seated.

15. The hydrogen water generator of claim 3, wherein the water tank includes a lid to close a top opening of the water tank,
    wherein a bottom surface of the upper body abuts the lid of the water tank when the water tank assembly is attached to the body of the hydrogen water generator.

16. The hydrogen water generator of claim 1, further comprising:
   a magnetic sensor disposed at the body; and
   a magnetic body disposed at the water tank assembly,
   wherein the magnetic sensor is configured to detect the magnetic body when the water tank assembly is attached to the body of the hydrogen water generator.

17. The hydrogen water generator of claim 1, further comprising:
   a magnetic body disposed at the water tank assembly; and
   another magnetic body disposed at the body,
   wherein the magnetic body disposed at the water tank assembly and the another magnetic body disposed at the body attract to each other when the water tank assembly is attached to the body of the hydrogen water generator.

18. The hydrogen water generator of claim 1, further comprising:
   a power receiver disposed at the water tank assembly; and
   a power transmitter disposed at the body of the hydrogen water generator.

19. The hydrogen water generator of claim 1, wherein the water tank assembly comprises a seating part projecting from a lower portion of the water tank assembly.

20. An appliance comprising a main body that includes the hydrogen water generator of claim 1.

* * * * *